(12) United States Patent
Yoo et al.

(10) Patent No.: US 9,312,553 B2
(45) Date of Patent: Apr. 12, 2016

(54) APPARATUS AND METHOD FOR CONTROLLING FUEL CELL SYSTEM

(71) Applicant: SK Innovation Co., Ltd., Seoul (KR)

(72) Inventors: Kyung Bin Yoo, Daejeon (KR); Young Dae Kim, Daejeon (KR); Seong Je Wu, Daejeon (KR); Su Hyun Lee, Daejeon (KR); Byung Hee Kang, Daejeon (KR); Jeong Pyo Lee, Daejeon (KR)

(73) Assignee: SK INNOVATION CO., LTD., Seoul (KR)

( * ) Notice: Subject to any disclaimer, the term of this patent is extended or adjusted under 35 U.S.C. 154(b) by 44 days.

(21) Appl. No.: 14/259,300

(22) Filed: Apr. 23, 2014

(65) Prior Publication Data

US 2015/0064588 A1     Mar. 5, 2015

(30) Foreign Application Priority Data

Sep. 5, 2013   (KR) .................. 10-2013-0106676

(51) Int. Cl.
| | |
|---|---|
| *H01M 8/04* | (2006.01) |
| *H02J 1/08* | (2006.01) |
| *H02J 1/10* | (2006.01) |
| H01M 8/12 | (2006.01) |
| H02J 1/00 | (2006.01) |

(52) U.S. Cl.
CPC ...... *H01M 8/04679* (2013.01); *H01M 8/04559* (2013.01); *H01M 8/04589* (2013.01); *H01M 8/04955* (2013.01); *H02J 1/08* (2013.01); *H02J 1/10* (2013.01); *H01M 2008/1293* (2013.01); *H02J 2001/004* (2013.01)

(58) Field of Classification Search
CPC .............. H01M 8/04679; H01M 2008/1293; H01M 8/04559; H01M 8/04589
USPC ............................................. 429/430
See application file for complete search history.

(56) References Cited

U.S. PATENT DOCUMENTS

2006/0127710 A1   6/2006   Schulte
2007/0268727 A1* 11/2007   Kim et al. ............... 363/78

OTHER PUBLICATIONS

European Search Report for related EPO Application No. 14166258.0; issued Aug. 8, 2014; 8 pages.

* cited by examiner

*Primary Examiner* — Jonathan Jelsma
*Assistant Examiner* — Rashid Alam
(74) *Attorney, Agent, or Firm* — Abelman, Frayne & Schwab

(57) ABSTRACT

Disclosed herein is an apparatus for controlling a fuel cell system, including: a plurality of stack state detecting units for detecting respective states of a plurality of fuel cell stacks; a switching unit for connecting at least parts of the plurality of fuel cell stacks to each other in series or in parallel; and a control unit for detecting at least one degraded stack based on the states of the stacks detected by the plurality of stack state detecting units, and forming at least one degraded stack unit including the detected at least one degraded stack by controlling the operation of the switching unit, so the apparatus can quickly and easily connect the stacks to each other in series, in parallel or in series-parallel using cheap electric switches instead of using a plurality of power conditioning system (PCS).

16 Claims, 12 Drawing Sheets

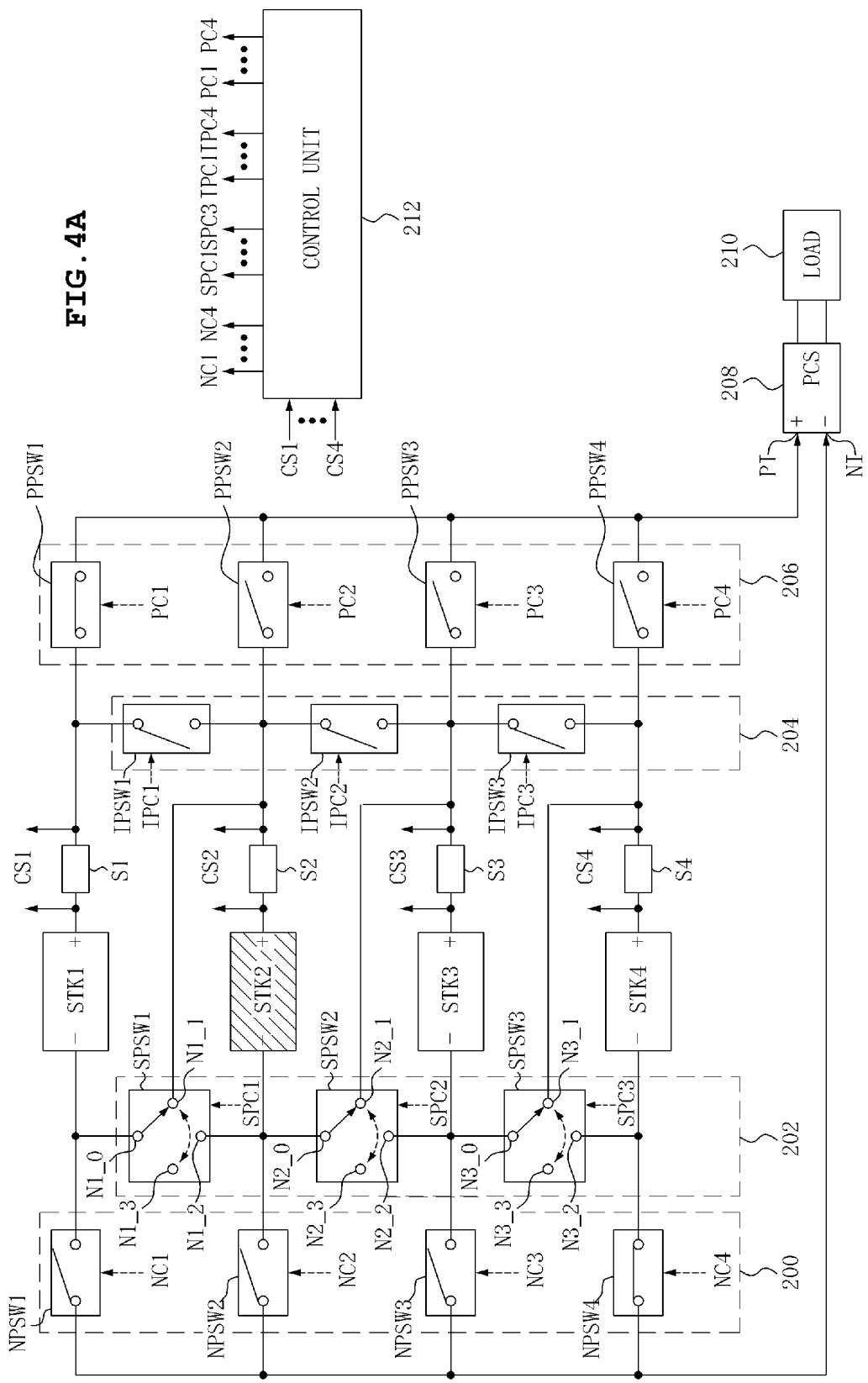

APPARATUS AND METHOD FOR CONTROLLING FUEL CELL SYSTEM

CROSS REFERENCE TO RELATED APPLICATION(S)

This application claims the benefit of Korean Patent Application No. 10-2013-0106676, filed on Sep. 5, 2013, entitled "Apparatus and Method for Controlling Fuel Cell System", which is hereby incorporated by reference in its entirety into this application.

BACKGROUND OF THE INVENTION

1. Technical Field

The present disclosure relates generally to a fuel cell system and, more particularly, to apparatus and method for controlling a fuel cell system including a plurality of fuel cells.

2. Description of the Related Art

In a solid oxide fuel cell (SOFC) system used for generating medium and large capacity power of several ten kilowatts (KW) to several megawatts (MW), a plurality of small capacity fuel cell stacks are connected to each other so as to form the desired medium and large capacity. The fuel cell stack has a structure in which several ten to several hundred unit fuel cells are stacked and connected together so as to form desired output power.

When forming a fuel cell system by electrically connecting the fuel cell stacks to each other in series only, the fuel cell system is problematic in that, when even one stack is shut down because a problem occurs in the stack, the electric connection of all the fuel cell stacks of the fuel cell system is disconnected, so the fuel cell system is shut down. Accordingly, to avoid the above-mentioned problem, it is typical to form a fuel cell system by electrically connecting the stacks to each other in series and in parallel.

However, when a part of connected stacks in a fuel cell system in which the stacks are connected together in parallel is degraded, the degradation of the stack may be propagated to the other normal stacks, so the reduction in the durability of the fuel cell system is accelerated and the capacity of the fuel cell system is reduced, thereby reducing the life span of the fuel cell system.

FIG. 1A is a view illustrating propagation of degradation between fuel cell stacks when the stacks are connected to each other in parallel. FIG. 1B is a graph showing stack voltage as a function of stack current, in which the propagation of degradation between the fuel cell stacks when the stacks are connected to each other in parallel is shown.

As shown in FIGS. 1A and 1B, when one fuel cell stack is degraded in a fuel cell system in which a plurality of fuel cell stacks are electrically connected to each other in parallel (one stack degraded, see [2] of FIG. 2A), the internal resistance of the degraded stack is increased, so a leaning of current to normal stacks is generated. In other words, the flow of current in the degraded stack of the stacks connected to each other in parallel is restricted due to an increase in the internal resistance of the degraded stack, so the amount of current flowing in the degraded stack is reduced, but the amount of current flowing in normal stacks is increased compared to normal operation. Described in brief, when a stack of the fuel cell system is degraded, the current leans to the normal stacks, so the flow of current in the stacks becomes unbalanced. In this case, although the amount of current flowing in the degraded stack is reduced, the current leans to the normal stacks and the degradation is propagated to the normal stacks (primary propagation of degradation, see [3] of FIG. 2A).

In this case, the exothermic reaction of the degraded stack is reduced, resulting in a reduction in the temperature of the degraded stack, so the internal resistance of the degraded stack is further increased and the leaning of current to the normal stacks becomes worse, thereby increasing the propagation of degradation to the normal stacks and accelerating the degradation of both the degraded stack and the normal stacks (secondary propagation of degradation, see [4] of FIG. 2A).

FIG. 1C is a view illustrating propagation of degradation of a stack to normal stacks in a fuel cell system when stack degradation is accelerated. FIG. 1D is a graph showing the comparison of the life span of an abnormal fuel cell system, in which the stack degradation is accelerated, to the life span of a normal fuel cell system.

As shown in FIGS. 1C and 1D, when a part of stacks connected to each other in the fuel cell system is degraded and the degradation is accelerated, the degradation of the degraded stack is propagated to normal stacks, thereby reducing the durability, capacity and like span of the fuel cell system.

As the easiest method of avoiding the propagation of degradation of the degraded stack to the normal stacks, the currents and voltages of all the stacks in the fuel cell system may be independently controlled. However, to control the currents and voltages of all the stacks in the fuel cell system independently, the construction of the fuel cell system becomes complicated and the production cost of the system is increased. Particularly, to produce an SOFC system for generating medium and large capacity power, a plurality of stacks should be used, so it is problematic in that practical production of the SOFC system for commercial use, in which the stacks are equipped with respective power conditioning systems (PCS), is almost impossible.

Patent document 1 shown in the following "Documents of Related Art" discloses "a fuel cell system provided with a bypass circuit and a method of operating the system". As shown in FIG. 2 of patent document 1, the invention of patent document 1 includes a bypass circuit 300 and a switching circuit 250 to 254, and is configured such that, when a degraded stack exists in the system, the bypass circuit bypasses the degraded stack using the switching circuit, thereby preventing the degraded stack from ill-affecting normal stacks.

However, the invention of patent document 1 discloses only the technique of bypassing a degraded stack, but does not disclose of a technique of reusing a degraded stack by rearranging the degraded stack.

Accordingly, it is required in the related art to propose apparatus and method for controlling a fuel cell system, which can easily and quickly connect fuel cell stacks to each other in series, in parallel or in series-parallel using cheap electric switches instead of using a plurality of power conditioning systems (PCS) during an operation of the fuel cell system, thereby preventing propagation of performance reduction between the stacks, improving durability of the fuel cell system, preventing a reduction in the capacity of the fuel cell system, and minimizing a reduction in the life span of the fuel cell system, and which can reuse degraded stacks by rearranging the degraded stacks with normal stacks, thereby efficiently using the fuel cell stacks.

DOCUMENTS OF RELATED ART (Patent Document 1) Korean Patent Application Publication No. 10-2012-0017596.

SUMMARY OF THE INVENTION

Accordingly, the present disclosure has been made keeping in mind the above problems occurring in the prior art, and an object of the present disclosure is to provide an apparatus for controlling a fuel cell system, which can easily and quickly connect fuel cell stacks to each other in series, in parallel or in series-parallel using cheap electric switches instead of using a plurality of power conditioning systems (PCS) during an operation of the fuel cell system, thereby preventing propagation of performance reduction between the stacks, improving durability of the fuel cell system, preventing a reduction in the capacity of the fuel cell system, and minimizing a reduction in the life span of the fuel cell system, and which can reuse degraded stacks by rearranging the degraded stacks with normal stacks, thereby efficiently using the fuel cell stacks.

Another object of the present disclosure is to provide a method of controlling a fuel cell system, which can easily and quickly connect fuel cell stacks to each other in series, in parallel or in series-parallel using cheap electric switches instead of using a plurality of power conditioning systems (PCS) during an operation of the fuel cell system, thereby preventing propagation of performance reduction between the stacks, improving durability of the fuel cell system, preventing a reduction in the capacity of the fuel cell system, and minimizing a reduction in the life span of the fuel cell system, and which can reuse degraded stacks by rearranging the degraded stacks with normal stacks, thereby efficiently using the fuel cell stacks.

In order to achieve the above objects, according to an embodiment of the present disclosure, there is provided an apparatus for controlling a fuel cell system, including: a plurality of stack state detecting units for detecting respective states of a plurality of fuel cell stacks; a switching unit for connecting at least parts of the plurality of fuel cell stacks to each other in series or in parallel; and a control unit for detecting at least one degraded stack based on the states of the stacks detected by the plurality of stack state detecting units, and forming at least one degraded stack unit including the detected at least one degraded stack by controlling the operation of the switching unit.

In the apparatus for controlling the fuel cell system according to the embodiment of the present disclosure, the control unit connects the at least one degraded stack unit to another degraded stack unit or to at least one normal stack in series, in parallel or in series-parallel by controlling the operation of the switching unit.

Further, in the apparatus for controlling the fuel cell system according to the embodiment of the present disclosure, the control unit may connect the at least one degraded stack unit including the detected at least one degraded stack to another degraded stack unit or to at least one normal stack in series by controlling the operation of the switching unit.

In the apparatus for controlling the fuel cell system according to the embodiment of the present disclosure, each of the at least one degraded stack unit may include at least one degraded stack and an m number of or more normal stacks, wherein m is an integer not less than zero (0).

In the apparatus for controlling the fuel cell system according to the embodiment of the present disclosure, the plurality of fuel cell stacks may be arrayed in an n1×1, n1×n2 or n1×n2×n3 array, wherein n1, n2 and n3 are integers not less than two (2).

In the apparatus for controlling the fuel cell system according to the embodiment of the present disclosure, the control unit may connect the arrayed stacks to each other in series, in parallel or in series-parallel by controlling the operation of the switching unit, and may supply output power of the stacks to a power conditioning system (PCS).

In the apparatus for controlling the fuel cell system according to the embodiment of the present disclosure, when the control unit detects at least one failed stack based on states of stacks detected by $1^{st}$ to $n^{th}$ stack state detecting units, the control unit may electrically disconnect the at least one failed stack from the fuel cell system by controlling the operation of the switching unit.

In the apparatus for controlling the fuel cell system according to the embodiment of the present disclosure, the stack state detecting units may detect currents or voltages of the stacks and may supply the detected currents or voltages of the stacks to the control unit, and the control unit may detect the degraded stack based on the currents or voltages detected by the stack state detecting units.

In the apparatus for controlling the fuel cell system according to the embodiment of the present disclosure, the switching unit may include: a negative pole connection switching unit for selectively connecting negative poles of the stacks to a negative voltage input terminal of the power conditioning system in response to a control signal of the control unit; a series-parallel connection switching unit for connecting negative poles of neighboring stacks of the stacks to each other or connecting the neighboring stacks to each other in series in response to a control signal of the control unit; a parallel connection switching unit for connecting positive poles of the neighboring stacks of the stacks to each other in response to a control signal of the control unit; and a positive pole connection switching unit for selectively connecting positive poles of the stacks to a positive voltage input terminal of the power conditioning system in response to a control signal of the control unit.

In the apparatus for controlling the fuel cell system according to the embodiment of the present disclosure, when n is an integer not less than two (2), the plurality of stacks may include $1^{st}$ to $n^{th}$ stacks, and the stack state detecting units may include $1^{st}$ to $n^{th}$ stack state detecting units, wherein first ends of the $1^{st}$ to $n^{th}$ stack state detecting units may be connected to positive poles of the $1^{st}$ to $n^{th}$ stacks, respectively; and the negative pole connection switching unit may include $1^{st}$ to $n^{th}$ negative pole connection switches, the series-parallel connection switching unit may include $1^{st}$ to $n-1^{th}$ series-parallel connection switches, the parallel connection switching unit may include $1^{st}$ to $n-1^{th}$ parallel connection switches, and the positive pole connection switching unit may include $1^{st}$ to $n^{th}$ positive pole connection switches, wherein each of the $1^{st}$ to $n-1^{th}$ series-parallel connection switches may include a common terminal and $1^{st}$ to $3^{rd}$ terminals, the $1^{st}$ to $n^{th}$ negative pole connection switches, the $1^{st}$ to $n-1^{th}$ parallel connection switches and the $1^{st}$ to $n^{th}$ positive pole connection switches may include respective first and second ends, wherein the first ends may be electrically connected to or disconnected from the second ends in response to a control signal of the control unit, and the common terminal of each of the $1^{st}$ to $n-1^{th}$ series-parallel connection switches may be connected to one of the $1^{st}$ to $3^{rd}$ terminals in response to a control signal of the control unit.

In the apparatus for controlling the fuel cell system according to the embodiment of the present disclosure, the first ends of the $1^{st}$ to $n^{th}$ negative pole connection switches may be commonly connected to the negative voltage input terminal of the power conditioning system, and the second ends of the $1^{st}$ to $n^{th}$ negative pole connection switches may be connected to negative poles of the $1^{st}$ to $n^{th}$ stacks, respectively, the common terminals of the $1^{st}$ to $n-1^{th}$ series-parallel connection switches may be connected to the negative poles of the $1^{st}$ to $n-1^{th}$ stacks, respectively, and the $1^{st}$ terminals of the $1^{st}$ to $n-1^{th}$ series-parallel connection switches may be connected to second ends of the $2^{nd}$ to $n^{th}$ stack state detecting units, respectively, the $2^{nd}$ terminals of the $1^{st}$ to $n-1^{th}$ series-parallel connection switches may be connected to the negative poles of the $2^{nd}$ to $n^{th}$ stacks, respectively, and the $3^{rd}$ terminals of the $1^{st}$ to $n-1^{th}$ series-parallel connection switches may be opened, the first ends of the $1^{st}$ to $n-1^{th}$ parallel connection switches may be connected to the second ends of the $1^{st}$ to $n-1^{th}$ stack state detecting units, respectively, and the second ends of the $1^{st}$ to $n-1^{th}$ parallel connection switches may be connected to the second ends of the $2^{nd}$ to $n^{th}$ stack state detecting units, and the first ends of the $1^{st}$ to $n^{th}$ positive pole connection switches may be connected to the second ends of the $1^{st}$ to $n^{th}$ stack state detecting units, respectively, and the second ends of the $1^{st}$ to $n^{th}$ positive pole connection switches may be commonly connected to the positive voltage input terminal of the power conditioning system.

In order to achieve the above objects, according to another embodiment of the present disclosure, there is provided an apparatus for controlling a fuel cell system, the fuel cell system including a plurality of fuel cell stack modules each having a predetermined number of fuel cell stacks, the apparatus including: a plurality of stack module state detecting units for detecting respective states of the plurality of fuel cell stack modules; a switching unit for connecting at least parts of the plurality of fuel cell stack modules to each other in series or in parallel; and a control unit for detecting at least one degraded stack module based on the states of the stack modules detected by the plurality of stack module state detecting units, and forming at least one degraded stack module unit including the detected at least one degraded stack module by controlling the operation of the switching unit.

In the apparatus for controlling the fuel cell system according to the embodiment of the present disclosure, the control unit may connect the at least one degraded stack module unit to another degraded stack module unit or to at least one normal stack module in series, in parallel or in series-parallel by controlling the operation of the switching unit.

In the apparatus for controlling the fuel cell system according to the embodiment of the present disclosure, the control unit may connect the at least one degraded stack module unit including the detected at least one degraded stack module to another degraded stack module unit or to at least one normal stack module in series by controlling the operation of the switching unit.

In the apparatus for controlling the fuel cell system according to the embodiment of the present disclosure, the at least one degraded stack module unit may include at least one degraded stack module and an m number of or more normal stack modules, wherein m is an integer not less than zero (0).

In order to achieve the above objects, according to a further embodiment of the present disclosure, there is provided a method of controlling a fuel cell system including a plurality of fuel cell stacks electrically connected to each other in series or in parallel, the method including: determining whether at least one degraded stack exists in the system by detecting states of the fuel cell stacks by a control unit; and when the control unit determines that at least one degraded stack exists in the fuel cell system, forming at least one degraded stack unit including the at least one degraded stack by controlling an operation of the switching unit.

The method of controlling the fuel cell system according to the embodiment of the present disclosure may further include: connecting the at least one degraded stack unit to another degraded stack unit or to at least one normal stack in series, in parallel or in series-parallel by controlling the operation of the switching unit by the control unit.

In the method of controlling the fuel cell system according to the embodiment of the present disclosure, the control unit may connect the at least one degraded stack unit to another degraded stack unit or to at least one normal stack in series by controlling the operation of the switching unit.

In the method of controlling the fuel cell system according to the embodiment of the present disclosure, each of the at least one degraded stack unit may include at least one degraded stack and an m number of or more normal stacks, wherein m is an integer not less than zero (0).

In the method of controlling the fuel cell system according to the embodiment of the present disclosure, the plurality of fuel cell stacks may be arrayed in an $n1 \times 1$, $n1 \times n2$ or $n1 \times n2 \times n3$ array, wherein $n1$, $n2$ and $n3$ are integers not less than two (2).

In the method of controlling the fuel cell system according to the embodiment of the present disclosure, the control unit may connect the arrayed stacks to each other in series, in parallel or in series-parallel by controlling the operation of the switching unit, and may supply output power of the stacks to a power conditioning system (PCS).

In the method of controlling the fuel cell system according to the embodiment of the present disclosure, the control unit may determine whether at least one failed stack exists in the fuel cell system by detecting the states of the fuel cell stacks, and when the control unit determines that at least one failed stack exists in the fuel cell system, the control unit may electrically disconnect the at least one failed stack from the fuel cell system by controlling the operation of the switching unit.

In the method of controlling the fuel cell system according to the embodiment of the present disclosure, a stack state detecting units may detect currents or voltages of the stacks and may supply the detected currents or voltages of the stacks to the control unit, and the control unit may detect the degraded stack based on the currents or voltages detected by the stack state detecting units.

Various objects, advantages and features of the invention will become apparent from the following description of embodiments with reference to the accompanying drawings.

The terms and words used in the present specification and claims should not be interpreted as being limited to typical meanings or dictionary definitions, but should be interpreted as having meanings and concepts relevant to the technical scope of the present disclosure based on the rule according to which an inventor can appropriately define the concept of the terms to describe most appropriately the best method he or she knows for carrying out the invention.

As described above, the apparatus and method for controlling the fuel cell system according to the present disclosure can easily and quickly connect fuel cell stacks to each other in series, in parallel or in series-parallel using cheap electric switches instead of using a plurality of power conditioning systems (PCS) during an operation of the fuel cell system, so the apparatus and method can prevent propagation of performance reduction between the stacks, thereby improving durability of the fuel cell system, preventing a reduction in the capacity of the fuel cell system, and minimizing a reduction in the life span of the fuel cell system, and the apparatus and method can reuse degraded stacks by rearranging the degraded stacks with normal stacks, thereby efficiently using the fuel cell stacks.

BRIEF DESCRIPTION OF THE DRAWINGS

The above and other objects, features and advantages of the present disclosure will be more clearly understood from the following detailed description taken in conjunction with the accompanying drawings, in which:

FIG. 4A is a block diagram illustrating a second operation of the apparatus for controlling the fuel cell system according to a third embodiment of the present disclosure when a degraded stack exists in the system;

DESCRIPTION OF THE PREFERRED EMBODIMENTS

Figure 1A:
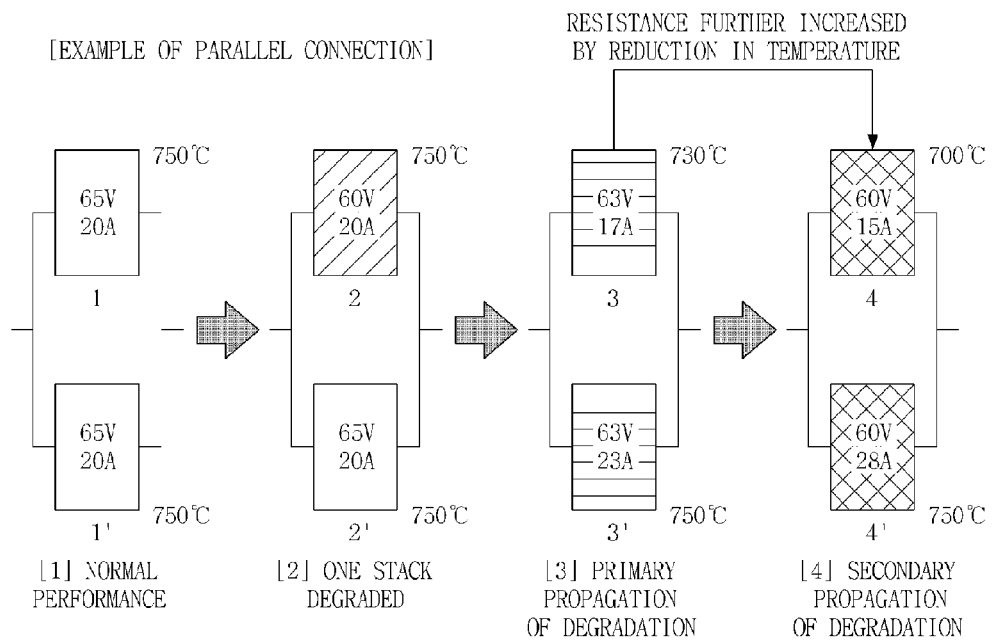
FIG. 1A is a view illustrating propagation of degradation between fuel cell stacks when the stacks are connected to each other in parallel.
Figure 1B:
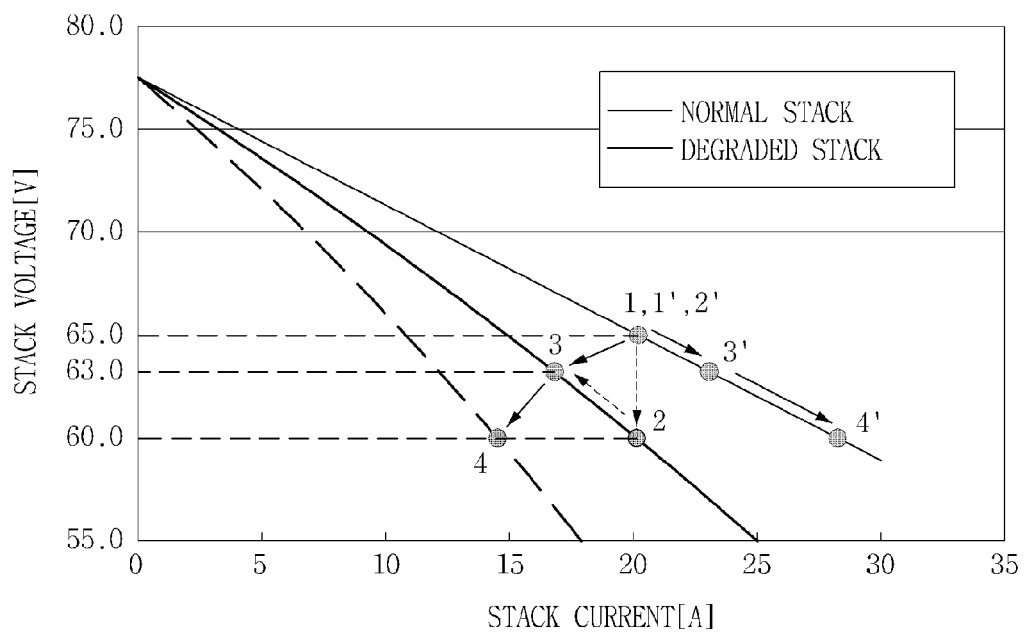
FIG. 1B is a graph showing stack voltage as a function of stack current, in which the propagation of degradation between the fuel cell stacks when the stacks are connected to each other in parallel is shown.
Figure 1C:
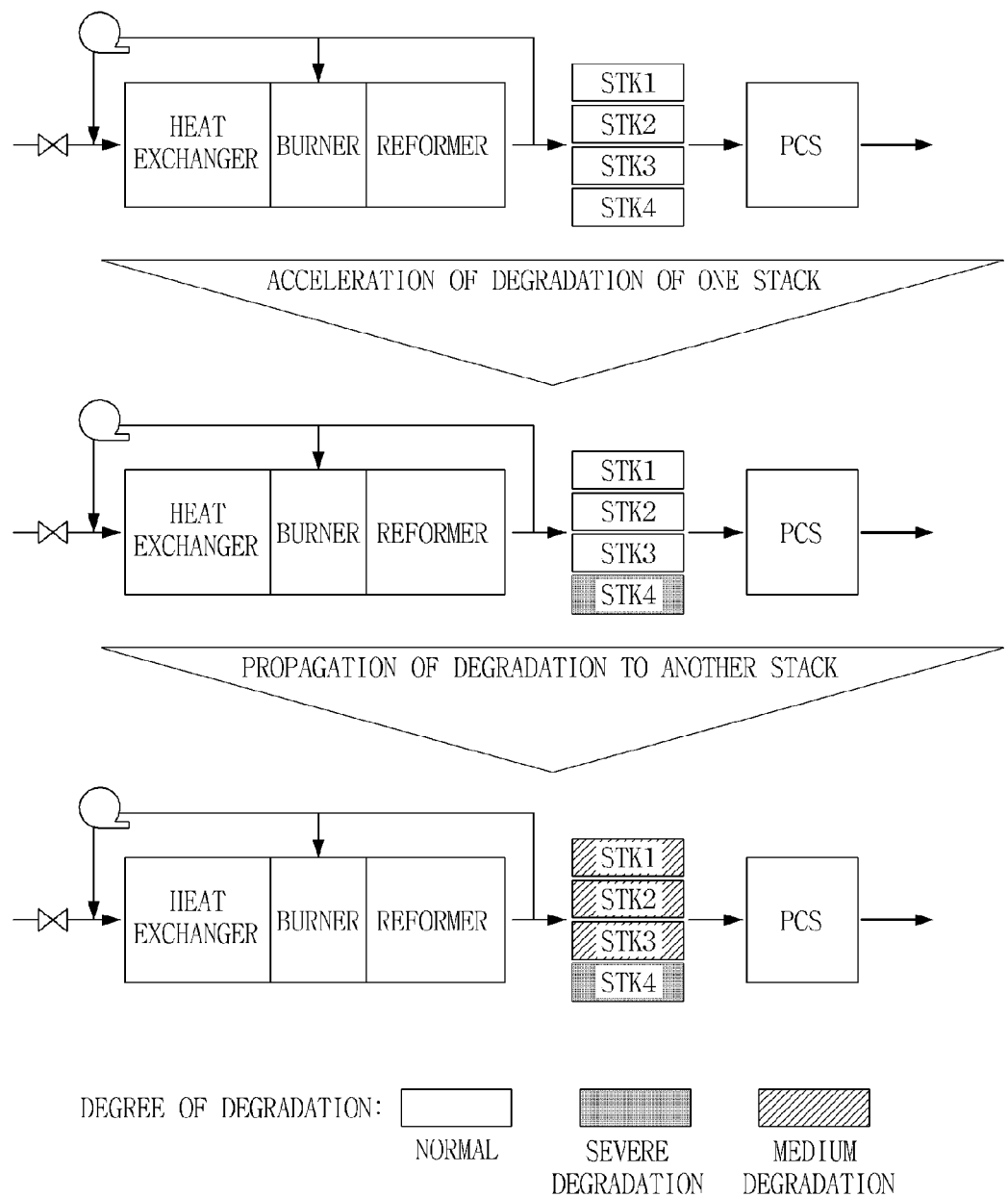
FIG. 1C is a view illustrating propagation of degradation of a stack to normal stacks in a fuel cell system when stack degradation is accelerated.
Figure 1D:
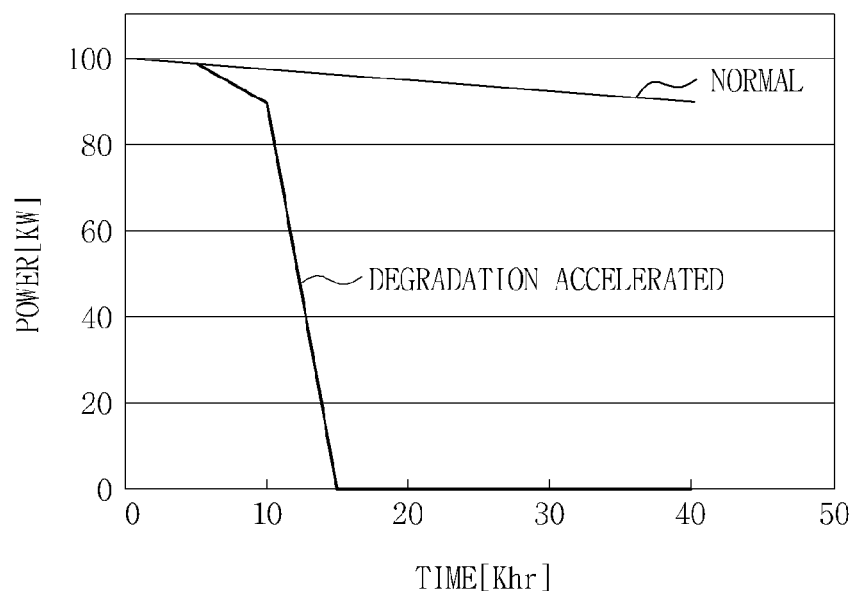
FIG. 1D is a graph showing the comparison of the life span of an abnormal fuel cell system, in which the stack degradation is accelerated, to the life span of a normal system.

The above and other objects, features and advantages of the present disclosure will be more clearly understood from the following detailed description taken in conjunction with the accompanying drawings.

Reference now should be made to the drawings, in which the same reference numerals are used throughout the different drawings to designate the same or similar components.

Further, it will be understood that, although the terms "first," "second," etc. may be used herein to describe various elements, these elements should not be limited by these terms.

Further, when it is determined that the detailed description of the known art related to the present disclosure might obscure the gist of the present disclosure, the detailed description thereof will be omitted.

Hereinbelow, exemplary embodiments of the present disclosure will be described in detail with reference to the accompanying drawings.

Figure 2A:
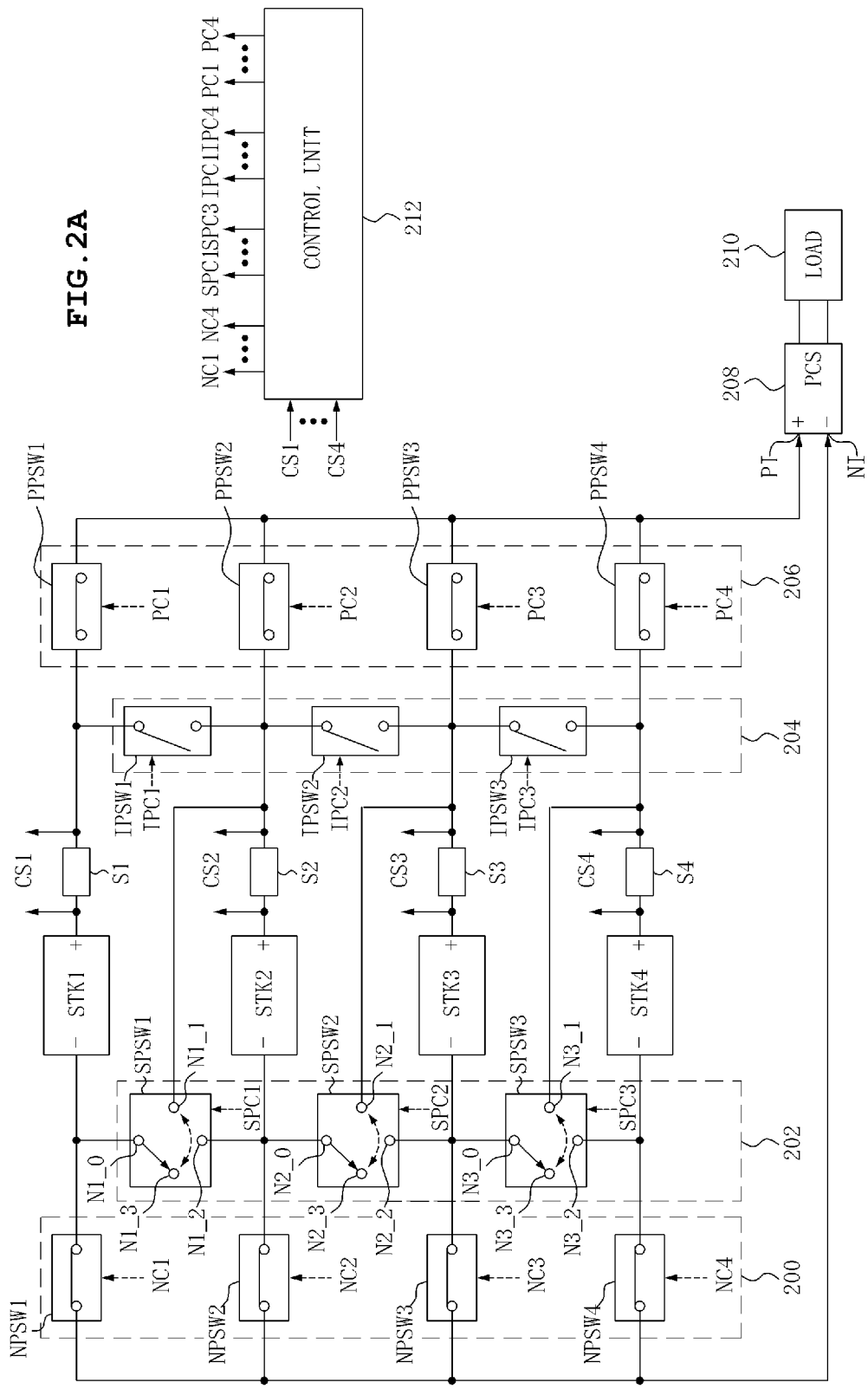
FIG. 2A is a block diagram illustrating the operation of an apparatus for controlling a fuel cell system according to a first embodiment of the present disclosure when normal stacks exist in the system exclusively.
Figure 2B:
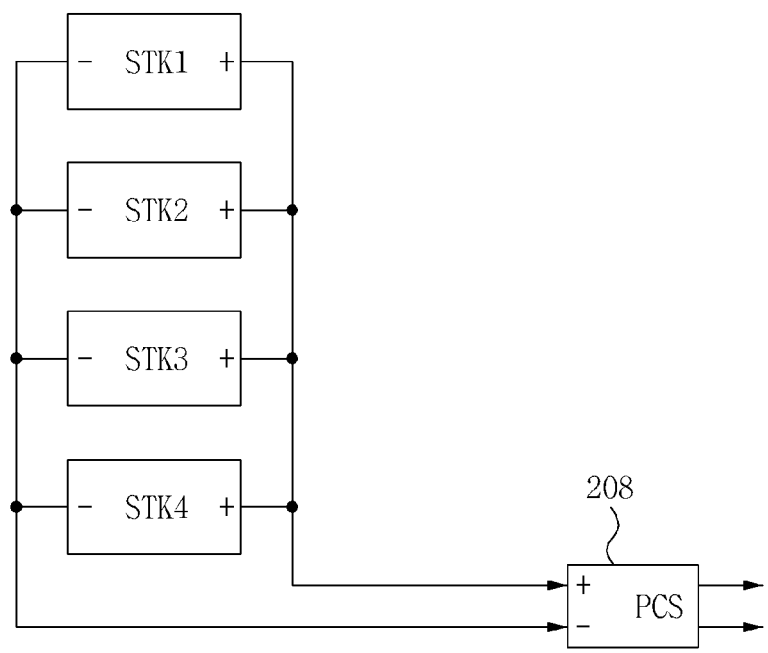
FIG. 2B is a block diagram illustrating an electric connection of the fuel cell stacks of the fuel cell system of FIG. 2A.

FIG. 2A is a block diagram illustrating an operation of an apparatus for controlling a fuel cell system according to the first embodiment of the present disclosure when there are normal stacks exclusively in the system. FIG. 2B is a block diagram illustrating an electric connection of the fuel cell stacks of the fuel cell system of FIG. 2A.

The apparatus for controlling the fuel cell system according to the first embodiment of the present disclosure shown in FIG. 2A includes: $1^{st}$ to $4^{th}$ stack state detecting units S1 to S4 for detecting the states of $1^{st}$ to $4^{th}$ stacks STK1 to STK4 the, switching units 200, 202, 204 and 206 for connecting at least parts of the $1^{st}$ to $4^{th}$ stacks STK1 to STK4 to each other in series or in parallel, and a control unit 212 for detecting at least one degraded stack based on the states of the stacks detected by the $1^{st}$ to $4^{th}$ stack state detecting units S1 to S4, and forming a degraded stack unit (see FIG. 3B) including the detected at least one degraded stack by controlling the operation of the switching units 200, 202, 204 and 206, thereby connecting the degraded stack unit to at least one normal stack in series.

Here, the degraded stack unit includes both at least one degraded stack and an m number of or more normal stacks, wherein m is an integer not less than zero (0).

Further, the degraded stack unit means a unit in which the detected at least one degraded stack is connected to a predetermined number (zero (0) or higher number) of normal stacks in series or in parallel. In other words, the degraded stack unit may include one or more degraded stacks exclusively or may include one or more degraded stacks and one or more normal stacks.

In the present disclosure, when a degraded stack exists in the system, the control unit 212 forms at least one degraded stack unit by connecting the detected at least one degraded stack to zero (0) or more normal stacks in series or in parallel, and connects the formed at least one degraded stack unit to another degraded stack unit or to other normal stacks in series, in parallel or in series-parallel.

When connecting the degraded stack unit to a normal stack in series, the current does not lean to the other normal stacks, so it is possible to prevent propagation of degradation from the degraded stack to the other normal stacks. Further, when forming the degraded stack unit by connecting the degraded stack to zero (0) or more normal stacks in series or in parallel, although a predetermined number of normal stacks that are connected to the degraded stack in parallel is degraded due to a leaning of current thereto, remaining normal stacks are not affected by the degraded stack, so the reduction in the performance of the fuel cell system due to the degraded stack is negligible.

Further, in the present disclosure, the degraded stack is not electrically disconnected from the fuel cell system, but the degraded stack and normal stacks are rearranged and used by forming a degraded stack unit by connecting the degraded stack to zero (0) or more normal stacks in series or in parallel, so it is possible to use the degraded stack until the state of the degraded stack becomes failed. Accordingly, the present disclosure can improve the durability of the fuel cell system, can prevent a reduction in the life span of the fuel cell system, and can efficiently use the fuel cell system.

FIG. 2A is a block diagram illustrating the operation of the apparatus for controlling the fuel cell system according to the first embodiment of the present disclosure when normal stacks exist in the fuel cell system exclusively. In the fuel cell system of FIG. 2A, no degraded stack exists, so no degraded stack unit exists in the fuel cell system.

The degraded stack unit will be described later herein with reference to FIGS. 3A to 5B.

The control unit 212 supplies output power of the stacks that are connected to each other in series, in parallel or in series-parallel to a power conditioning system (PCS) 208 by controlling the operation of the switching units 200, 202, 204 and 206. The power conditioning system 208 converts DC input power into AC power, controls the AC power, and outputs the AC power to a load 210.

The $1^{st}$ to $4^{th}$ stack state detecting units S1 to S4 detect currents or voltages of the $1^{st}$ to $4^{th}$ stacks STK1 to STK4, and output state detection signals CS1 to CS4 to the control unit 212. The control unit 212 detects a degraded stack based on the state detection signals CS1 to CS4 applied from the stack state detecting units S1 to S4.

The $1^{st}$ to $4^{th}$ stack state detecting units S1 to S4 may include respective distributors or respective hall sensors which can sense currents flowing in the $1^{st}$ to $4^{th}$ stacks STK1 to STK4. The control unit 212 can detect a degraded stack based on currents or voltages of the $1^{st}$ to $4^{th}$ stacks STK1 to STK4.

The switching units 200, 202, 204 and 206 include: a negative pole connection switching unit 200 that selectively connects the negative poles of the $1^{st}$ to $4^{th}$ stacks STK1 to STK4 to a negative voltage input terminal NI of the power conditioning system 208 in response to control signals NC1 to NC4 of the control unit 212; a series-parallel connection switching unit 202 that connects the negative poles of neighboring stacks of the $1^{st}$ to $4^{th}$ stacks STK1 to STK4 to each other or connects the neighboring stacks to each other in series in response to control signals SPC1, SPC2 and SPC3 of the control unit 212; a parallel connection switching unit 204 that connects the positive poles of neighboring stacks of the $1^{st}$ to $4^{th}$ stacks STK1 to STK4 to each other in response to control signals IPC1, IPC2 and IPC3 of the control unit 212; and a positive pole connection switching unit 206 that selectively connects the positive poles of the $1^{st}$ to $4^{th}$ stacks STK1 to STK4 to a positive voltage input terminal PI of the power conditioning system 208 in response to control signals PC1 to PC4 of the control unit 212.

The first ends of the $1^{st}$ to $4^{th}$ stack state detecting units S1 to S4 are connected to the positive poles of the $1^{st}$ to $4^{th}$ stacks STK1 to STK4, respectively. In addition, the negative pole connection switching unit 200 includes $1^{st}$ to $4^{th}$ negative pole connection switches NPSW1 to NPSW4, the series-parallel connection switching unit 202 includes $1^{st}$ to $3^{rd}$ series-parallel connection switches SPSW1, SPSW2 and SPSW3, the parallel connection switching unit 204 includes $1^{st}$ to $3^{rd}$ parallel connection switches IPSW1, IPSW2 and IPSW3, and the positive pole connection switching unit 206 includes $1^{st}$ to $4^{th}$ positive pole connection switches PPSW1 to PPSW4.

The $1^{st}$ to $3^{rd}$ series-parallel connection switches SPSW1, SPSW2 and SPSW3 include common terminals N1_0, N2_0 and N3_0, $1^{st}$ terminals N1_1, N2_1 and N3_1, $2^{nd}$ terminals N1_2, N2_2 and N3_2 and $3^{rd}$ terminals N1_3, N2_3 and N3_3, respectively.

In the $1^{st}$ to $4^{th}$ negative pole connection switches NPSW1 to NPSW4, the $1^{st}$ to $3^{rd}$ parallel connection switches IPSW1 to IPSW3 and the $1^{st}$ to $4^{th}$ positive pole connection switches PPSW1 to PPSW4, the first ends thereof may be electrically connected to or disconnected from the second ends thereof in response to control signals NC1 to NC4, IPC1, IPC2, IPC3, PC1, PC2 and PC3 of the control unit 212.

In each of the $1^{st}$ to $3^{rd}$ series-parallel connection switches SPSW1, SPSW2 and SPSW3, the common terminal N1_0, N2_0, N3_0 is connected to one of the $1^{st}$ terminal N1_1, N2_1, N3_1, the $2^{nd}$ terminal N1_2, N2_2, N3_2 and the $3^{rd}$ terminal N1_3, N2_3, N3_3 in response to a control signal SPC1, SPC2, SPC3 of the control unit 212.

The first ends of $1^{st}$ to $4^{th}$ negative pole connection switches NPSW1 to NPSW4 are commonly connected to the negative voltage input terminal NI of the power conditioning system 208. The second ends of the $1^{st}$ to $4^{th}$ negative pole connection switches NPSW1 to NPSW4 are connected to the negative poles of the $1^{st}$ to $4^{th}$ stacks STK1 to STK4, respectively.

The common terminals N1_0, N2_0 and N3_0 of the $1^{st}$ to $3^{rd}$ series-parallel connection switches SPSW1, SPSW2 and SPSW3 are connected to the negative poles of the $1^{st}$ to $4^{th}$ stacks STK1 to STK4, respectively. Further, the $1^{st}$ terminals N1_1, N2_1 and N3_1 of the $1^{st}$ to $3^{rd}$ series-parallel connection switches SPSW1, SPSW2 and SPSW3 are connected to the second ends of the $2^{nd}$ to $4^{th}$ stack state detecting units S2 to S4, respectively. The $2^{nd}$ terminals N1_2, N2_2 and N3_2 of the $1^{st}$ to $3^{rd}$ series-parallel connection switches SPSW1, SPSW2 and SPSW3 are connected to the negative poles of the $2^{nd}$ to $4^{th}$ stacks STK2 to STK4, respectively. In this case, the $3^{rd}$ terminals N1_3, N2_3 and N3_3 of the $1^{st}$ to $3^{rd}$ series-parallel connection switches SPSW1, SPSW2 and SPSW3 are open. Here, the meaning of the open terminals is that the terminals are connected to nothing.

The first ends of the $1^{st}$ to $3^{rd}$ parallel connection switches IPSW1, IPSW2 and IPSW3 are connected to the second ends of the $1^{st}$ to $3^{rd}$ the stack state detecting units S1 to S3, respectively. Further, the second ends of the $1^{st}$ to $3^{rd}$ parallel connection switches IPSW1, IPSW2 and IPSW3 are connected to the second ends of the $2^{nd}$ to $4^{th}$ stack state detecting units S2 to S4, respectively.

The first ends of the $1^{st}$ to $4^{th}$ positive pole connection switches PPSW1 to PPSW4 are connected to the second ends of the $1^{st}$ to $4^{th}$ stack state detecting units S1 to S4, respectively. Further, the second ends of the $1^{st}$ to $4^{th}$ positive pole connection switches PPSW1 to PPSW4 are commonly connected to the positive voltage input terminal PI of the power conditioning system 208.

In this embodiment, the fuel cell may be a solid oxide fuel cell. However, it should be understood that the fuel cell of the present disclosure is not limited to the solid oxide fuel cell.

In the present disclosure, each of the $1^{st}$ to $3^{rd}$ series-parallel connection switches SPSW1, SPSW2 and SPSW3 may be a single pole triple throw (SPTT) switch in which a common terminal can be electrically connected to one of $1^{st}$ to $3^{rd}$ terminals in response to a control signal SPC1, SPC2, SPC3. Further, the $1^{st}$ to $4^{th}$ negative pole connection switches NPSW1 to NPSW4, the $1^{st}$ to $3^{rd}$ parallel connection switches IPSW1, IPSW2 and IPSW3 and the $1^{st}$ to $4^{th}$ positive pole connection switches PPSW1 to PPSW4 may be single pole double throw (SPDT) switches which are configured such that first ends thereof are electrically connected to second ends thereof. However, the types of switches of the present disclosure may be changed without being limited to the SPDT switches if the switches can perform the same functions as described above.

In the apparatus for controlling the fuel cell system according to the first embodiment of the present disclosure shown in FIG. 2A, the electric connection of four stacks that are the $1^{st}$ to $4^{th}$ stacks STK1 to STK4 is controlled. However, the present disclosure can control the electric connection of an n number of stacks that are $1^{st}$ to $n^{th}$ stacks STK1 to STKn (not shown), wherein n is an integer not less than two (2), without being limited to the above-mentioned configuration. In this case, the configuration of the switching units 200, 202, 204 and 206 shown in FIG. 2A may be expanded so as to efficiently change the electric connection of the $1^{st}$ to $n^{th}$ stacks STK1 to STKn.

Further, the apparatus for controlling the fuel cell system according to the first embodiment of the present disclosure shown in FIG. 2A may include fuel cell stacks that are arrayed in an n1×1, n1×n2 or n1×n2×n3 stack array, wherein n1, n2 and n3 are integers not less than two (2). Further, the electric connection of the stacks that are connected to each other in series, in parallel or in series-parallel may be changed (not shown). In this case, the configuration of the switching units 200, 202, 204 and 206 shown in FIG. 2A may be expanded so as to efficiently change the electric connection of the n1×1 stacks, the n1×n2 stacks or the n1×n2×n3 stacks which are connected to each other in series, in parallel or in series-parallel.

Further, the embodiment of FIG. 2A is configured such that the connection of the plurality of fuel cell stacks can be controlled both by the control unit 212 and by the switching units 200, 202, 204 and 206. However, the configuration of the present disclosure may be changed without being limited to the above-mentioned configuration in such a way that a predetermined number of fuel cell stacks constitute a fuel cell stack module, a plurality of fuel cell stacks constitute a plurality of fuel cell stack modules, and the electric connection of the plurality of fuel cell stack modules can be changed both by the control unit 212 and by the switching units 200, 202, 204 and 206.

In other words, in a fuel cell system that includes a plurality of fuel cell stack modules each having a predetermined number of fuel cell stacks, the control unit 212 may detect at least one degraded stack module based on the states of stack modules detected by a plurality of stack module state detecting units (not shown), and may form a degraded stack module unit (not shown) including the detected at least one degraded stack module by controlling the operation of a switching unit (not shown), and may connect the degraded stack module unit to another degraded stack module unit or to at least one normal stack module in series, in parallel or in series-parallel.

The operation of the apparatus for controlling the fuel cell system according to the first embodiment of the present disclosure will be described in detail hereinbelow.

First Embodiment

Operation Performed when Normal Stacks Exist in Fuel Cell System Exclusively

FIG. 2A is a block diagram illustrating an operation of the apparatus for controlling the fuel cell system according to the first embodiment of the present disclosure when normal stacks exist in the system exclusively. FIG. 2B is a block diagram illustrating an electric connection of the fuel cell stacks of the fuel cell system of FIG. 2A.

As shown in FIG. 2A, the control unit 212 determines where a degraded stack exists in the fuel cell system in response to state detection signals CS1 to CS4 indicative of the states of the $1^{st}$ to $4^{th}$ stacks STK1 to STK4 detected by the $1^{st}$ to $4^{th}$ stack state detecting units S1 to S4.

Here, the state detection signals CS1 to CS4 may be signals indicative of currents or voltages of the $1^{st}$ to $4^{th}$ stacks STK1 to STK4, although the state detection signals CS1 to CS4 of the present disclosure are not limited to the above-mentioned signals.

In the embodiment shown in FIG. 2A, no degraded stack exists in the fuel cell system, but all the stacks are normally operated, so the control unit 212 outputs control signals NC1 to NC4, SPC1, SPC2, SPC3, IPC1, IPC2, IPC3, and PC1 to PC4 suited to the switching units 200, 202, 204 and 206, and connects the $1^{st}$ to $4^{th}$ stacks STK1 to STK4 in parallel, thereby supplying electric power of the 1st to 4th stacks STK1 to STK4 to the power conditioning system (PCS) 208.

FIG. 2B is the block diagram illustrating the electric connection of the fuel cell stacks of the fuel cell system when the $1^{st}$ to $4^{th}$ stacks STK1 to STK4 are connected to each other in parallel in a state in which no degraded stack exists in the fuel cell system, but normal stacks exist in the fuel cell system exclusively, as described above. FIG. 2B illustrates that the electric power of the 1st to 4th stacks STK1 to STK4 connected together in parallel is supplied to the power conditioning system 208.

Second Embodiment

First Operation Performed when a Degraded Stack Exists in the Fuel Cell System

Figure 3A:
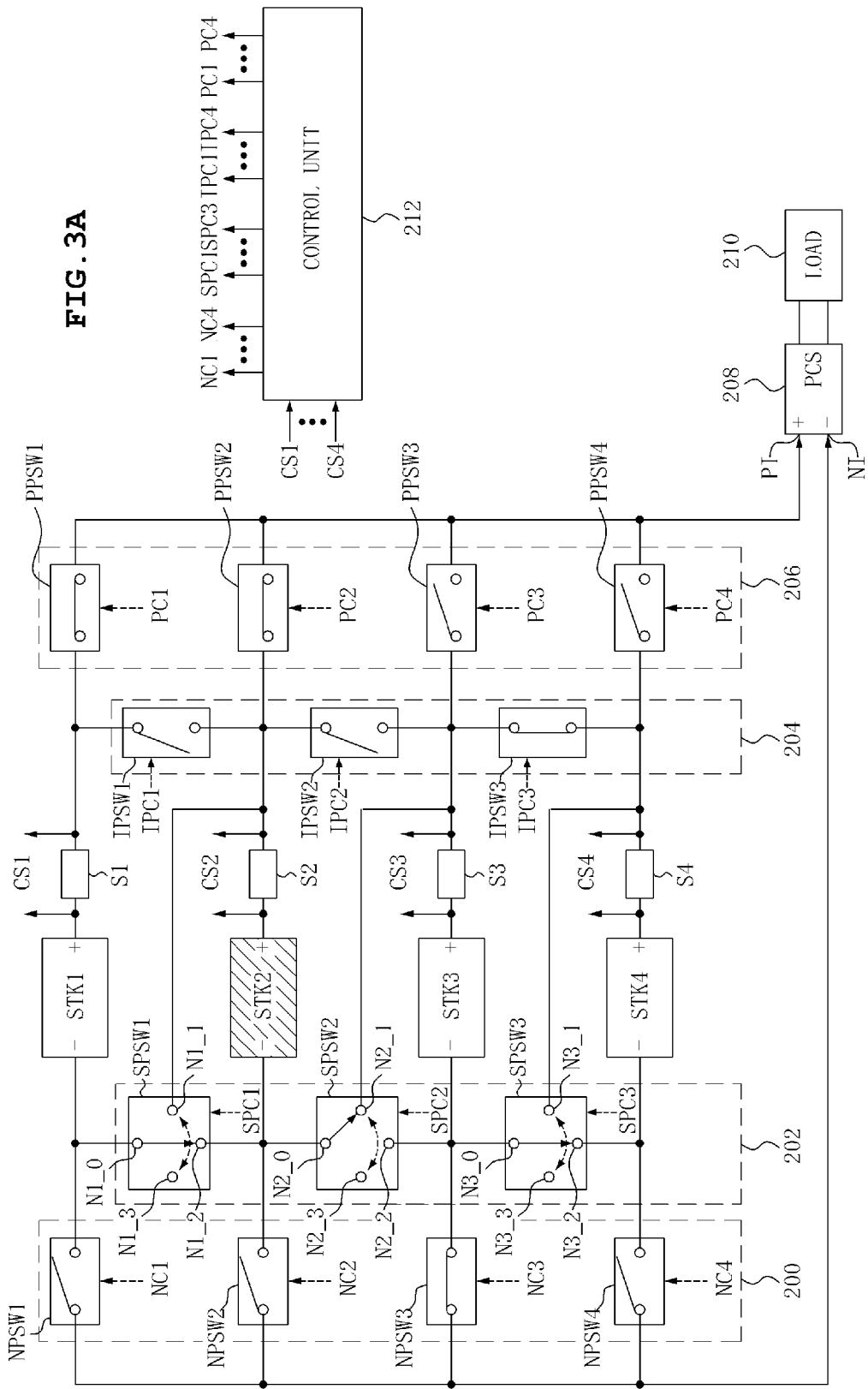
FIG. 3A is a block diagram illustrating a first operation of the apparatus for controlling the fuel cell system according to a second embodiment of the present disclosure when a degraded stack exists in the system.
Figure 3B:
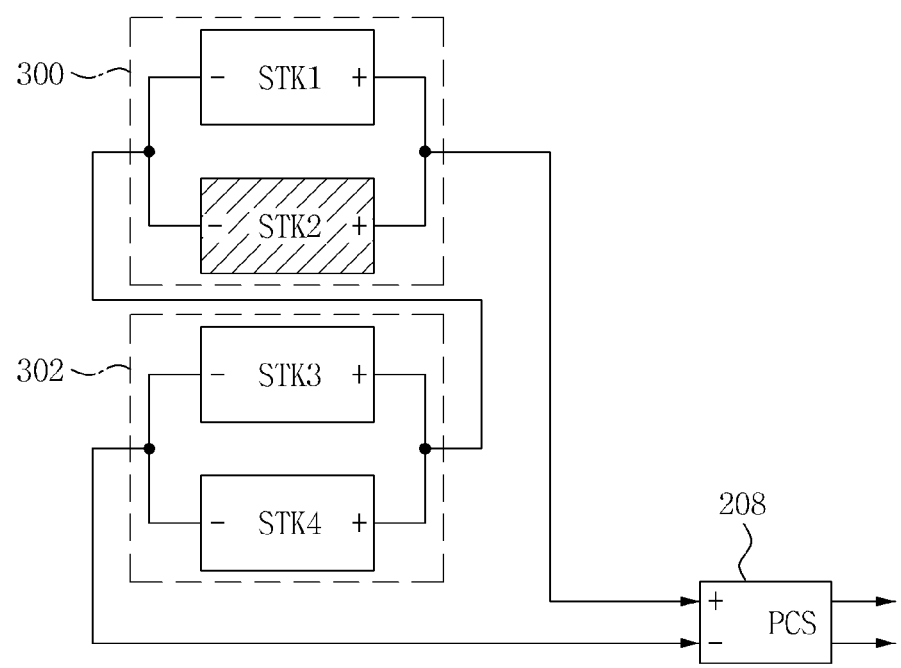
FIG. 3B is a block diagram illustrating an electric connection of the fuel cell stacks of the fuel cell system of FIG. 3A.

FIG. 3A is a block diagram illustrating a first operation of the apparatus for controlling the fuel cell system according to a second embodiment of the present disclosure when a degraded stack exists in the system. FIG. 3B is a block diagram illustrating an electric connection of the fuel cell stacks of the fuel cell system of FIG. 3A.

As shown in FIG. 3A, the control unit 212 determines whether a degraded stack exists in the fuel cell system in response to state detection signals CS1 to CS4 indicative of the states of the $1^{st}$ to $4^{th}$ stacks STK1 to STK4 detected by the $1^{st}$ to $4^{th}$ stack state detecting units S1 to S4.

Here, the state detection signals CS1 to CS4 may be signals indicative of currents or voltages of the $1^{st}$ to $4^{th}$ stacks STK1 to STK4, although the state detection signals CS1 to CS4 of the present disclosure are not limited to the above-mentioned signals.

In the embodiment of FIG. 3A, it is assumed that the $2^{nd}$ stack STK2 is degraded.

When the $2^{nd}$ stack STK2 is degraded as described above, the current or voltage of the $2^{nd}$ stack STK2 that is a degraded stack will be different from currents or voltages of the $1^{st}$ stack STK1, the $3^{rd}$ stack STK3 and the $4^{th}$ stack STK4 that are normal stacks.

As is well known to those skilled in the art, when a stack is degraded, the performance of the stack is reduced, so the voltage and current of the degraded stack become lower than normal voltage and current of the stack in a normal state. Accordingly, the control unit 212 can determine whether a stack is degraded or not by comparing the currents or voltages included in the state detection signals CS1 to CS4 output from the $1^{st}$ to $4^{th}$ stack state detecting units S1 to S4 to normal currents or voltages of the stacks.

Here, because the $2^{nd}$ stack STK2 is degraded in the embodiment of FIG. 3A, the control unit 212 can detect that the current or voltage included in the state detection signal CS2 is lower than the normal current or voltage. Accordingly, the control unit 212 determines that the $2^{nd}$ stack STK2 has been degraded and that the $2^{nd}$ stack STK2 has become a degraded stack.

When the control unit 212 determines that a degraded stack exists in the fuel cell system, the control unit 212 controls the operation of the switching units 200, 202, 204 and 206 so as to connect the stacks to each other as shown in FIG. 3B.

As shown in FIGS. 3A and 3B, the control unit 212 connects the $2^{nd}$ stack STK2 that is the degraded stack to the $1^{st}$ stack STK1 that is a normal stack in parallel by controlling the operation of the switching units 200, 202, 204 and 206, thereby forming a degraded stack unit 300.

Further, the control unit 212 connects the $3^{rd}$ stack STK3 and the $4^{th}$ stack STK4 which are normal stacks to each other in parallel, thereby forming a normal stack unit 302 as shown in FIG. 3B. Thereafter, the control unit 212 connects the normal stack unit 302 to the degraded stack unit 300 in series.

In the degraded stack unit 300, the $1^{st}$ stack STK1 that is the normal stack is connected to the $2^{nd}$ stack STK2 that is the degraded stack in parallel, so the current may be leaned to the $1^{st}$ stack STK1 and the $1^{st}$ stack STK1 may be degraded due to the leaning of current thereto. However, in this case, the $3^{rd}$ stack STK3 and the $4^{th}$ stack STK4 which are normal stacks constituting the normal stack unit 302 are connected in series to the $2^{nd}$ stack STK2 that is the degraded stack, thereby preventing propagation of the performance reduction of the degraded $2^{nd}$ stack STK2 to the normal $3^{rd}$ stack STK3 or to the normal $4^{th}$ stack STK4.

When the degraded stack unit 300 is connected to the normal stacks STK3 and STK4 constituting the normal stack unit 302 in series, as described above, the current does not lean to the normal stacks STK3 and STK4, so it is possible to prevent propagation of degradation from the degraded stack STK2 to the other normal stacks STK3 and STK4. Further, when the degraded stack unit 300 is formed by connecting the degraded stack STK2 to the normal stack STK1 in parallel, the normal stack STK1 that is connected to the degraded stack STK2 in parallel may be somewhat degraded due to a leaning of current thereto. However, in this case, the other normal stacks STK3 and STK4 are not affected by the degraded stack STK2, so the performance reduction of the fuel cell system due to the degraded stack STK2 is negligible.

Further, in this case, although the output voltage and current of the degraded stack STK2 are lower than normal voltage and current of the stack STK2, the output voltage and current of the degraded stack STK2 are maintained at usable levels. Accordingly, when the stacks STK1 to STK4 are connected to each other in such a way that the normal stacks with the exception of the stack STK1 can be free from propagation of the performance reduction of the degraded stack STK2 thereto as shown in FIGS. 3A and 3B, the present disclosure can reuse the degraded stack STK2 by rearranging the degraded stack without discarding the degraded stack. Thus, the present disclosure can allow reuse of a degraded stack without ill-affecting the performance of the fuel cell system, can improve durability of the fuel cell system, and can minimize a reduction in the life span of the fuel cell system.

Hereinbelow, the operation of the control unit 212 in which the control unit 212 connects the stacks STK1 to STK4 to each other as shown in FIG. 3B by controlling the operation of the switching units 200, 202, 204 and 206 will be described in detail with reference to FIG. 3A.

In the embodiment of FIG. 3A in which the $2^{nd}$ stack STK2 is degraded, the control unit 212 detects that the current or voltage included in the state detection signal CS2 is lower than normal current or voltage, and determines that the $2^{nd}$ stack STK2 has been degraded and that the $2^{nd}$ stack STK2 is a degraded stack.

Thereafter, the control unit 212 applies respective appropriate control signals NC1, NC2 and NC4 to the $1^{st}$, $2^{nd}$ and $4^{th}$ negative pole connection switches NPSW1, NPSW2 and NPSW4, thereby bringing the $1^{st}$, $2^{nd}$ and $4^{th}$ negative pole connection switches NPSW1, NPSW2 and NPSW4 into respective OFF states. In other words, the first ends of the $1^{st}$, $2^{nd}$ and $4^{th}$ negative pole connection switches NPSW1, NPSW2 and NPSW4 are disconnected from the second ends thereof. Further, the control unit 212 applies an appropriate control signal NC3 to the $3^{rd}$ negative pole connection switch NPSW3, thereby bringing the $3^{rd}$ negative pole connection switch NPSW3 into an ON state. In other words, the first and second ends of the $3^{rd}$ negative pole connection switch NPSW3 are connected to each other by the control unit 212.

Further, the control unit 212 applies an appropriate control signal SPC1 to the $1^{st}$ series-parallel connection switch SPSW1, thereby connecting the common terminal N1_0 to the $2^{nd}$ terminal N1_2, and applies an appropriate control signal SPC2 to the $2^{nd}$ series-parallel connection switch SPSW2, thereby connecting the common terminal N20 to the $1^{st}$ terminal N2_1, and applies an appropriate control signal SPC3 to the $3^{rd}$ series-parallel connection switch SPSW3, thereby connecting the common terminal N3_0 to the $2^{nd}$ terminal N3_2.

Further, the control unit 212 applies an appropriate control signal IPC1 to the $1^{st}$ parallel connection switch IPSW1, thereby bringing the $1^{st}$ parallel connection switch IPSW1 into an OFF state, and applies an appropriate control signal IPC2 to the $2^{nd}$ parallel connection switch IPSW2, thereby bringing the $2^{nd}$ parallel connection switch IPSW2 into an OFF state, and applies an appropriate control signal IPC3 to the $3^{rd}$ parallel connection switch IPSW3, thereby bringing the $3^{rd}$ parallel connection switch IPSW3 into an ON state.

Further, the control unit 212 applies an appropriate control signal PC1 to the $1^{st}$ positive pole connection switch PPSW1, thereby bringing the $1^{st}$ positive pole connection switch PPSW1 into an ON state, an applies an appropriate control signal PC2 to the $2^{nd}$ positive pole connection switch PPSW2, thereby bringing the $2^{nd}$ positive pole connection switch PPSW2 into an ON state, and applies an appropriate control signal PC3 to the $3^{rd}$ positive pole connection switch PPSW3, thereby bringing the $3^{rd}$ positive pole connection switch PPSW3 into an OFF state, and applies an appropriate control signal PC4 to the $4^{th}$ positive pole connection switch PPSW4, thereby bringing the $4^{th}$ positive pole connection switch PPSW4 into an OFF state.

Here, the ON state of a switch of the present disclosure means a state in which the first end of the switch is electrically connected to the second end thereof, and the OFF state of a switch means a state in which the first end of the switch is electrically disconnected from the second end thereof.

When the control unit 212 controls the operation of the respective switches NPSW1 to NPSW4, SPSW1, SPSW2, SPSW3, IPSW1, IPSW2, IPSW3, and PPSW1 to PPSW4 as described above, the electric connection of the fuel cell stacks shown in FIG. 3B is formed.

In other words, by controlling the operation of the switches NPSW1 to NPSW4, SPSW1, SPSW2, SPSW3, IPSW1, IPSW2, IPSW3, and PPSW1 to PPSW4, the control unit 212 connects the $2^{nd}$ stack STK2 that is a degraded stack to the $1^{st}$ stack STK1 that is a normal stack in parallel, thereby forming the degraded stack unit 300, and connects the $3^{rd}$ stack STK3 and the $4^{th}$ stack STK4 that are normal stacks to each other in parallel, thereby forming the normal stack unit 302, and connects the degraded stack unit 300 to the normal stack unit 302 in series.

Here, because the $3^{rd}$ stack STK3 and the $4^{th}$ stack STK4 that are the other normal stacks constituting the normal stack unit 302 are connected to the $2^{nd}$ stack STK2 that is the degraded stack in series, the present disclosure can prevent propagation of the performance reduction of the degraded $2^{nd}$ stack STK2 to the normal $3^{rd}$ stack STK3 or to the normal $4^{th}$ stack STK4.

Further, by preventing propagation of the performance reduction of the degraded stack STK2 to normal stacks, the present disclosure can reuse the degraded stack STK2 by rearranging the degraded stack without discarding the degraded stack. Accordingly, the present disclosure can allow reuse of a degraded stack without ill-affecting the performance of the fuel cell system, can improve durability of the fuel cell system, and can minimize a reduction in the life span of the fuel cell system.

Third Embodiment

Second Operation Performed when Degraded Stack Exists in Fuel Cell System

Figure 4B:
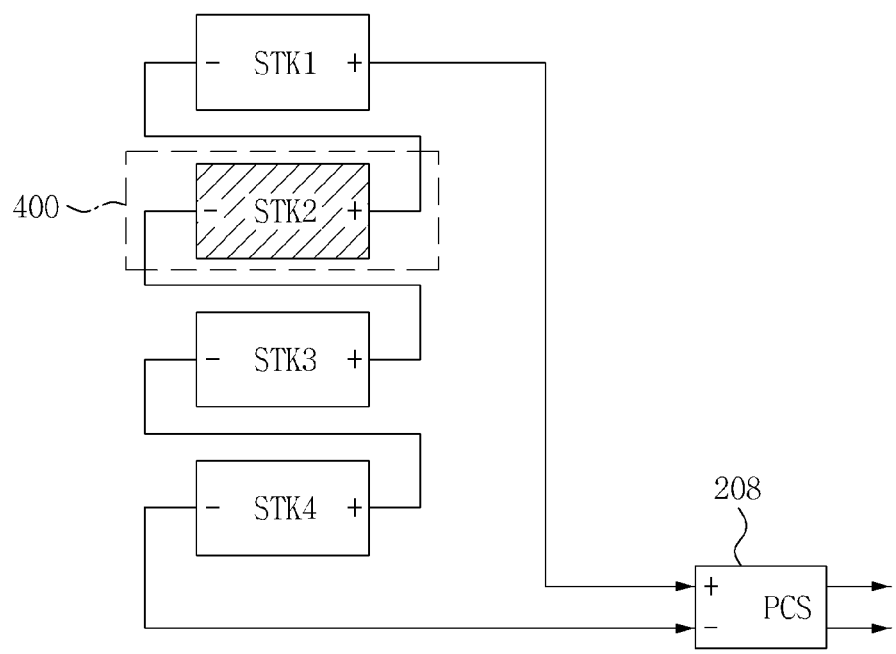
FIG. 4B is a block diagram illustrating an electric connection of the fuel cell stacks of the fuel cell system of FIG. 4A.

FIG. 4A is a block diagram illustrating a second operation of the apparatus for controlling the fuel cell system according to a third embodiment of the present disclosure when a degraded stack exists in the system. FIG. 4B is a block diagram illustrating an electric connection of the fuel cell stacks of the fuel cell system of FIG. 4A.

In the embodiment of FIG. 4A, the control unit 212 determines whether a degraded stack, the performance of which is reduced, exists in the fuel cell system based on state detection signals CS1 to CS4 indicative of the states of the $1^{st}$ to $4^{th}$ stacks STK1 to STK4 detected by the $1^{st}$ to $4^{th}$ stack state detecting units S1 to S4.

Here, the state detection signals CS1 to CS4 may be signals indicative of currents or voltages of the $1^{st}$ to $4^{th}$ stacks STK1 to STK4, although the state detection signals CS1 to CS4 of the present disclosure are not limited to the above-mentioned signals.

In the embodiment of FIG. 4A, it is assumed that the $2^{nd}$ stack STK2 is degraded.

When the $2^{nd}$ stack STK2 is degraded as described above, the current or voltage of the $2^{nd}$ stack STK2 that is a degraded stack will be different from currents or voltages of the $1^{st}$ stack STK1, the $3^{rd}$ stack STK3 and the $4^{th}$ stack STK4 that are normal stacks.

As is well known to those skilled in the art, when a stack is degraded, the performance of the stack is reduced, so the voltage and current of the degraded stack become lower than normal voltage and current of the stack in a normal state. Accordingly, the control unit 212 can determine whether a stack is degraded or not by comparing the currents or voltages included in the state detection signals CS1 to CS4 output from the $1^{st}$ to $4^{th}$ stack state detecting units S1 to S4 to normal currents or voltages of the stacks.

Here, because the $2^{nd}$ stack STK2 is degraded in the embodiment of FIG. 4A, the control unit 212 can detect that the current or voltage included in the state detection signal CS2 is lower than the normal current or voltage. Accordingly, the control unit 212 determines that the $2^{nd}$ stack STK2 has degraded and that the $2^{nd}$ stack STK2 has become a degraded stack.

When the control unit 212 determines that a degraded stack exists in the fuel cell system, the control unit 212 controls the operation of the switching units 200, 202, 204 and 206 so as to connect the stacks to each other as shown in FIG. 4B.

As shown in FIGS. 4A and 4B, the control unit 212 connects the $2^{nd}$ stack STK2 that is the degraded stack to the $1^{st}$ stack STK1, the $3^{rd}$ stack STK3 and the $4^{th}$ stack STK4 that are normal stacks in series by controlling the operation of the switching units 200, 202, 204 and 206. In the embodiment of FIGS. 4A and 4B, a degraded stack unit 400 is formed by the $2^{nd}$ stack STK2. In other words, in the embodiment of FIG. 4B, the degraded stack unit 400 includes only the $2^{nd}$ stack STK2 that is the degraded stack without including normal stacks.

Here, the $1^{st}$ stack STK1, the $3^{rd}$ stack STK3 and the $4^{th}$ stack STK4 which are normal stacks are connected to the $2^{nd}$ stack STK2 that is the degraded stack in series, so the present disclosure can prevent propagation of the performance reduction of the degraded $2^{nd}$ stack STK2 to the $1^{st}$ stack STK1, the $3^{rd}$ stack STK3 and the $4^{th}$ stack STK4 which are normal stacks.

When the degraded stack unit 400 is connected to the normal stacks STK1, STK3 and STK4 in series as described above, the current does not lean to the normal stacks STK1, STK3 and STK4, thereby preventing propagation of degradation of the degraded stack STK2 to the normal stacks STK1, STK3 and STK4.

Further, in this case, although the output voltage and current of the degraded stack STK2 are lower than normal voltage and current of the stack STK2, the output voltage and current of the degraded stack STK2 are maintained at usable levels. Accordingly, when the stacks STK1 to STK4 are connected to each other in such a way that the performance reduction of the degraded stack STK2 can be prevented from being propagated to the other normal stacks, the present disclosure can reuse the degraded stack STK2 by rearranging the degraded stack without discarding the degraded stack. Thus, the present disclosure can allow reuse of a degraded stack without ill-affecting the performance of the fuel cell system, can improve durability of the fuel cell system, and can minimize a reduction in the life span of the fuel cell system.

Hereinbelow, the operation of the control unit 212 in which the control unit 212 connects the stacks STK1 to STK4 to each other as shown in FIG. 4B by controlling the operation of the switching units 200, 202, 204 and 206 will be described in detail with reference to FIG. 4A.

In the embodiment of FIG. 4A in which the $2^{nd}$ stack STK2 is degraded, the control unit 212 detects that the current or voltage included in the state detection signal CS2 is lower than normal current or voltage, and determines that the $2^{nd}$ stack STK2 has been degraded and that the $2^{nd}$ stack STK2 is a degraded stack.

The control unit 212 applies respective appropriate control signals NC1, NC2 and NC3 to the $1^{st}$ to $3^{rd}$ the negative pole connection switches NPSW1 to NPSW3, thereby bringing the $1^{st}$ to $3^{rd}$ the negative pole connection switches NPSW1 to NPSW3 into respective OFF states. In other words, the control unit 212 makes the first ends of the $1^{st}$ to $3^{rd}$ the negative pole connection switches NPSW1 to NPSW3 disconnected from the second ends thereof. Further, the control unit 212 applies an appropriate control signal NC4 to the $4^{th}$ negative pole connection switch NPSW4, thereby bringing the $4^{th}$ negative pole connection switch NPSW4 into an ON state. In other words, the control unit 212 connects the first end of the $4^{th}$ negative pole connection switch NPSW4 to the second end thereof.

Further, the control unit 212 applies an appropriate control signal SPC1 to the $1^{st}$ series-parallel connection switch SPSW1, thereby connecting the common terminal N1_0 to the $1^{st}$ terminal N1_1, an applies an appropriate control signal SPC2 to the $2^{nd}$ series-parallel connection switch SPSW2, thereby connecting the common terminal N2_0 to the $1^{st}$ terminal N2_1, and applies an appropriate control signal SPC3 to the $3^{rd}$ series-parallel connection switch SPSW3, thereby connecting the common terminal N3_0 to the $1^{st}$ terminal N3_1.

Further, the control unit 212 applies an appropriate control signal IPC1 to the $1^{st}$ parallel connection switch IPSW1, thereby bringing the $1^{st}$ parallel connection switch IPSW1 into an OFF state, an applies an appropriate control signal IPC2 to the $2^{nd}$ parallel connection switch IPSW2, thereby bringing the $2^{nd}$ parallel connection switch IPSW2 into an OFF state, and applies an appropriate control signal IPC3 to the $3^{rd}$ parallel connection switch IPSW3, thereby bringing the $3^{rd}$ parallel connection switch IPSW3 into an OFF state.

Further, the control unit 212 applies an appropriate control signal PC1 to the $1^{st}$ positive pole connection switch PPSW1, thereby bringing the $1^{st}$ positive pole connection switch PPSW1 into an ON state, and applies an appropriate control signal PC2 to the $2^{nd}$ positive pole connection switch PPSW2, thereby bringing the $2^{nd}$ positive pole connection switch PPSW2 into an OFF state, and applies an appropriate control signal PC3 to the $3^{rd}$ positive pole connection switch PPSW3, thereby bringing the $3^{rd}$ positive pole connection switch PPSW3 into an OFF state, and applies an appropriate control signal PC4 to the 4$^{th}$ positive pole connection switch PPSW4, thereby bringing the 4$^{th}$ positive pole connection switch PPSW4 into an OFF state.

Here, the ON state of a switch of the present disclosure means a state in which the first end of the switch is electrically connected to the second end thereof, and the OFF state of a switch means a state in which the first end of the switch is electrically disconnected from the second end thereof.

When the control unit 212 controls the operation of the respective switches NPSW1 to NPSW4, SPSW1, SPSW2, SPSW3, IPSW1, IPSW2, IPSW3, and PPSW1 to PPSW4, an electric connection of the stacks shown in FIG. 4B is formed.

In other words, the control unit 212 connects the 2$^{nd}$ stack STK2 that is the degraded stack to the 1$^{st}$ stack STK1, the 3$^{rd}$ stack STK3 and the 4$^{th}$ stack STK4 which are normal stacks in series by controlling the operation of the switches NPSW1 to NPSW4, SPSW1, SPSW2, SPSW3, IPSW1, IPSW2, IPSW3, and PPSW1 to PPSW4.

Here, because the 1$^{st}$ stack STK1, the 3$^{rd}$ stack STK3 and the 4$^{th}$ stack STK4 which are the normal stacks are connected to the 2$^{nd}$ stack STK2 that is the degraded stack in series, the present disclosure can prevent propagation of the performance reduction of the degraded 2$^{nd}$ stack STK2 to the 1$^{st}$ stack STK1, the 3$^{rd}$ stack STK3 and the 4$^{th}$ stack STK4 which are the normal stacks.

Further, by preventing propagation of the performance reduction of the degraded stack STK2 to normal stacks, the present disclosure can reuse the degraded stack STK2 by rearranging the degraded stack without discarding the degraded stack. Accordingly, the present disclosure can allow reuse of a degraded stack without ill-affecting the performance of the fuel cell system, can improve durability of the fuel cell system, and can minimize a reduction in the life span of the fuel cell system.

Table 1 shows the comparison of the states and output power of respective stacks of the first embodiment in which all the four stacks that are the 1$^{st}$ to 4$^{th}$ stacks STK1 to STK4 of the fuel cell system are maintained as normal stacks, the second and third embodiments in each of which a degraded stack exists in the fuel cell system and the electric connection of the stacks is changed according to the present disclosure, and a comparative example in which no treatment using the control apparatus of the present disclosure is added although a degraded stack exists in the fuel cell system.

embodiments of the present disclosure, the degradation of the 2$^{nd}$ stack STK2 in the comparative example will be propagated to the other normal stacks and all the stacks will be degraded. Thus, the total capacity of the fuel cell system of the comparative example will be more quickly reduced compared to the embodiments of the present disclosure as time goes by.

Unlike the comparative example, the control apparatus of each of the second and third embodiments of the present disclosure can efficiently prevent propagation of degradation of the 2$^{nd}$ stack STK2 that is the degraded stack to normal stacks with the exception of a normal stack that is connected to the degraded stack in parallel, so the reduction in the capacity of the fuel cell system of the present disclosure is negligible regardless of the passage of time. Accordingly, the present disclosure can improve durability of the fuel cell system, can minimize a reduction in the life span of the fuel cell system, and can reuse a degraded stack by rearranging the degraded stack, thereby efficiently using the fuel cell stacks.

Fourth Embodiment

Operation Performed when Failed Stack Exists in Fuel Cell System

Figure 5A:
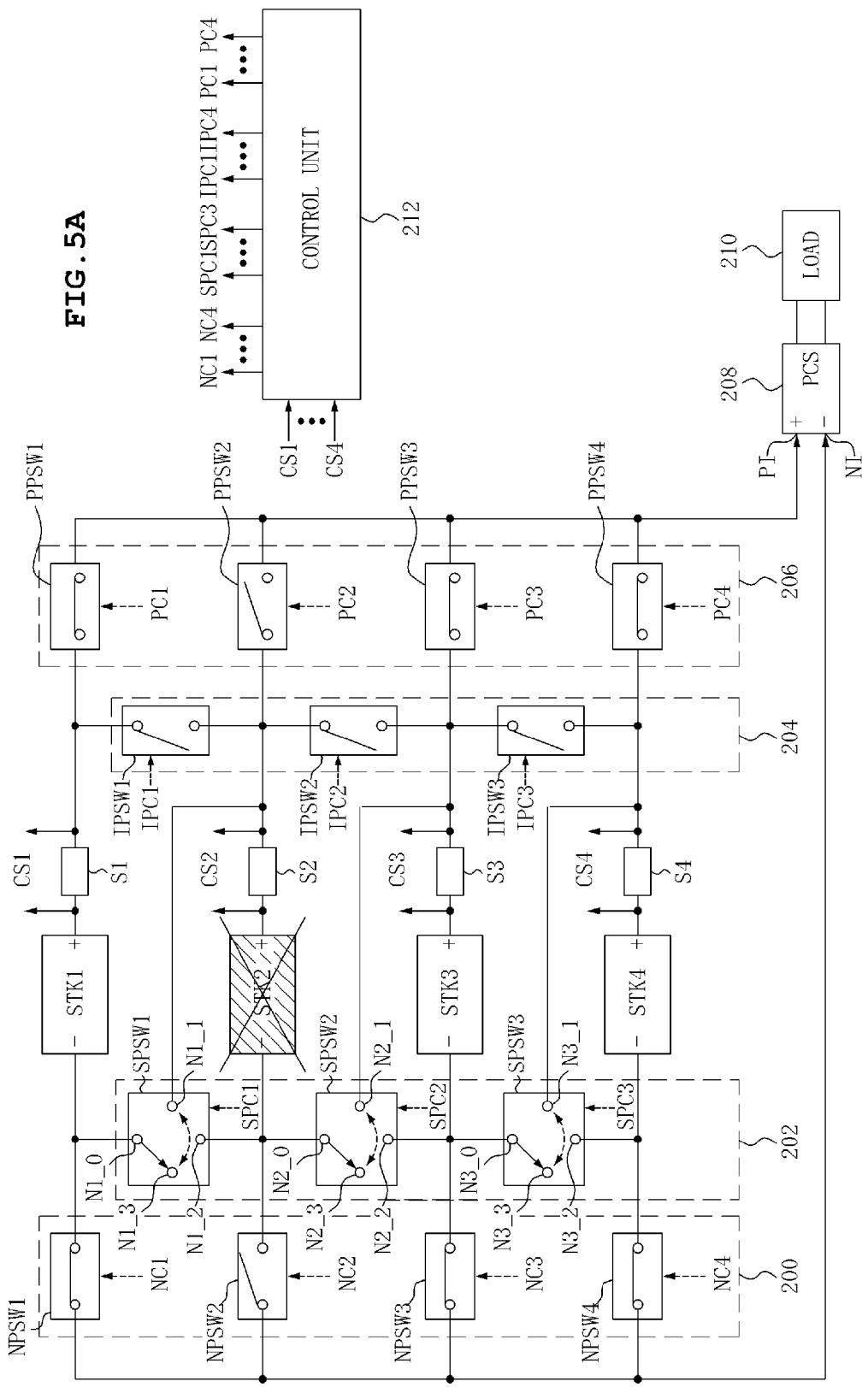
FIG. 5A is a block diagram illustrating an operation of the apparatus for controlling the fuel cell system according to the fourth embodiment of the present disclosure when an failed stack exists in the system.
Figure 5B:
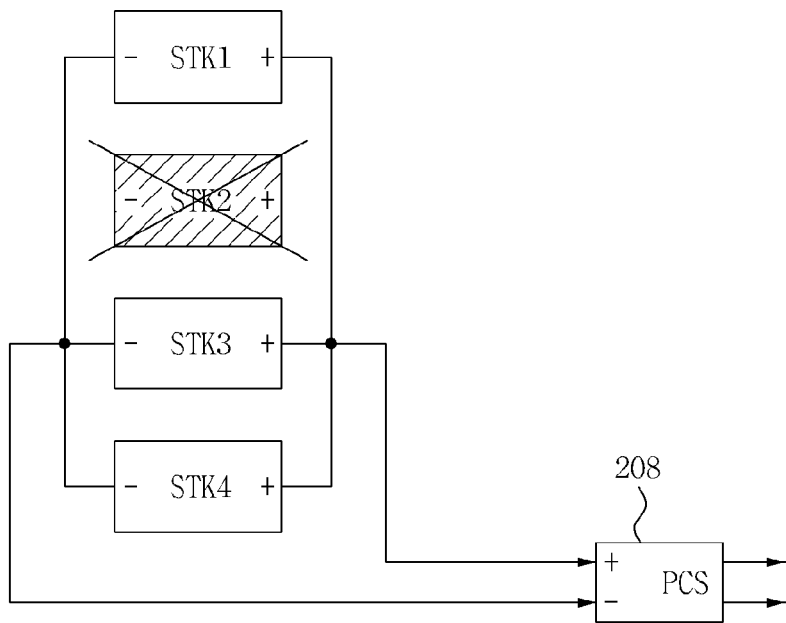
FIG. 5B is a block diagram illustrating an electric connection of the fuel cell stacks of the fuel cell system of FIG. 5A.

FIG. 5A is a block diagram illustrating an operation of the apparatus for controlling the fuel cell system according to a fourth embodiment of the present disclosure when an failed stack exists in the system. FIG. 5B is a block diagram illustrating an electric connection of the fuel cell stacks of the fuel cell system of FIG. 5A.

In the embodiment of FIG. 5A, the control unit 212 determines whether an failed stack exists in the fuel cell system based on state detection signals CS1 to CS4 indicative of the states of the 1$^{st}$ to 4$^{th}$ stacks STK1 to STK4 detected by the 1$^{st}$ to 4$^{th}$ stack state detecting units S1 to S4.

Here, the state detection signals CS1 to CS4 may be signals indicative of currents or voltages of the 1$^{st}$ to 4$^{th}$ stacks STK1 to STK4, although the state detection signals CS1 to CS4 of the present disclosure are not limited to the above-mentioned signals.

In the embodiment of FIG. 5A, it is assumed that the 2$^{nd}$ stack STK2 is failed. When the 2$^{nd}$ stack STK2 is failed as described above, the current or voltage of the 2$^{nd}$ stack STK2 that is an failed stack will be different from currents or volt-

TABLE 1

|  | 1$^{st}$ embodiment (initial stage of operation, four normal stacks connected in parallel) | 2$^{nd}$ stack degraded | No treatment added | 2$^{nd}$ embodiment [FIGS. 3A & 3B] (connecting degraded stack unit to normal stack unit in series) | 3$^{rd}$ embodiment [FIGS. 4A & 4B] (connecting degraded stack to normal stacks in series) |
|---|---|---|---|---|---|
| Total capacity V/A | 50 V/100 A |  | 48 V/104 A | 98 V/50 A | 196 V/25 A |
| Power | 5,000 W |  | 4,992 W | 4,900 W | 4,900 W |
| 1$^{st}$ stack | 50 V/25 A | 50 V/25 A | 48 V/27 A | 48 V/27 A | 50 V/25 A |
| 2$^{nd}$ stack | 50 V/25 A | 46 V/25 A | 48 V/23 A | 48 V/23 A | 46 V/25 A |
| 3$^{rd}$ stack | 50 V/25 A | 50 V/25 A | 48 V/27 A | 50 V/25 A | 50 V/25 A |
| 4$^{th}$ stack | 50 V/25 A | 50 V/25 A | 48 V/27 A | 50 V/25 A | 50 V/25 A |
| Results |  |  | all the stack degraded | 1$^{st}$ stack connected to degraded 2$^{nd}$ stack in parallel degraded, but normal 3$^{rd}$ and 4$^{th}$ stacks not degraded | normal stacks not degraded |

As disclosed in Table 1, although the total capacity of the fuel cell system of the comparative example to which no treatment using the control apparatus of the present disclosure is added looks larger than those of the second and third ages of the 1$^{st}$ stack STK1, the 3$^{rd}$ stack STK3 and the 4$^{th}$ stack STK4 that are normal stacks.

As is well known to those skilled in the art, when a stack is failed, the performance of the stack is exceedingly reduced, so the voltage and current of the failed stack become exceedingly lower than normal voltage and current of the stack in a normal state. Accordingly, the control unit 212 can determine whether a stack is failed or not by comparing the currents or voltages included in the state detection signals CS1 to CS4 output from the $1^{st}$ to $4^{th}$ stack state detecting units S1 to S4 to normal currents or voltages of the stacks.

Here, because the $2^{nd}$ stack STK2 is failed in the embodiment of FIG. 5A, the control unit 212 can detect that the current or voltage included in the state detection signal CS2 is lower than the normal current or voltage. Accordingly, the control unit 212 determines that the $2^{nd}$ stack STK2 has become failed and that the $2^{nd}$ stack STK2 has become an failed stack.

When the control unit 212 determines that an failed stack exists in the fuel cell system, the control unit 212 controls the operation of the switching units 200, 202, 204 and 206 so as to connect the stacks to each other as shown in FIG. 5B.

As shown in FIGS. 5A and 5B, the control unit 212 electrically disconnects the $2^{nd}$ stack STK2 that is the failed stack from the $1^{st}$ stack STK1, the $3^{rd}$ stack STK3 and the $4^{th}$ stack STK4 which are normal stacks by controlling the operation of the switching units 200, 202, 204 and 206. Accordingly, the control unit 212 electrically isolates the $2^{nd}$ stack STK2 that is the failed stack from the fuel cell system.

Here, because the $1^{st}$ stack STK1, the $3^{rd}$ stack STK3 and the $4^{th}$ stack STK4 which are normal stacks are electrically isolated from the $2^{nd}$ stack STK2 that is the failed stack, the present disclosure can prevent propagation of the performance reduction of the $2^{nd}$ stack STK2 that is the failed stack to the $1^{st}$ stack STK1, the $3^{rd}$ stack STK3 and the $4^{th}$ stack STK4 which are the normal stacks.

Hereinbelow, the operation of the control unit 212 in which the control unit 212 connects the stacks STK1 to STK4 to each other as shown in FIG. 5B by controlling the operation of the switching units 200, 202, 204 and 206 will be described in detail with reference to FIG. 5A.

In the embodiment of FIG. 5A in which the $2^{nd}$ stack STK2 is failed, the control unit 212 detects that the current or voltage included in the state detection signal CS2 is lower than normal current or voltage, and determines that the $2^{nd}$ stack STK2 has become failed and that the $2^{nd}$ stack STK2 is an failed stack.

The control unit 212 applies respective appropriate control signals NC1, NC3 and NC4 to the $1^{st}$, $3^{rd}$ and $4^{th}$ negative pole connection switches NPSW1, NPSW3 and NPSW4, thereby bringing the $1^{st}$, $3^{rd}$ and $4^{th}$ negative pole connection switches NPSW1, NPSW3 and NPSW4 into respective ON states. In other words, the first ends of the $1^{st}$, $3^{rd}$ and $4^{th}$ negative pole connection switches NPSW1, NPSW3 and NPSW4 are connected to the second ends thereof. Further, the control unit 212 applies an appropriate control signal NC2 to the $2^{nd}$ negative pole connection switch NPSW2, thereby bringing the $2^{nd}$ negative pole connection switch NPSW2 into an OFF state. In other words, the first end of the $4^{th}$ negative pole connection switch NPSW4 is disconnected from the second end thereof.

Further, the control unit 212 applies an appropriate control signal SPC1 to the $1^{st}$ series-parallel connection switch SPSW1, thereby connecting the common terminal N1_0 to the $3^{rd}$ terminal N1_3, and applies an appropriate control signal SPC2 to the $2^{nd}$ series-parallel connection switch SPSW2, thereby connecting the common terminal N2_0 to the $3^{rd}$ terminal N2_3, and applies an appropriate control signal SPC3 to the $3^{rd}$ series-parallel connection switch SPSW3, thereby connecting the common terminal N3_0 to the $3^{rd}$ terminal N3_3.

Further, the control unit 212 applies an appropriate control signal IPC1 to the $1^{st}$ parallel connection switch IPSW1, thereby bringing the $1^{st}$ parallel connection switch IPSW1 into an OFF state, and applies an appropriate control signal IPC2 to the $2^{nd}$ parallel connection switch IPSW2, thereby bringing the $2^{nd}$ parallel connection switch IPSW2 into an OFF state, and applies an appropriate control signal IPC3 to the $3^{rd}$ parallel connection switch IPSW3, thereby bringing the $3^{rd}$ parallel connection switch IPSW3 into an OFF state.

Further, the control unit 212 applies an appropriate control signal PC1 to the $1^{st}$ positive pole connection switch PPSW1, thereby bringing the $1^{st}$ positive pole connection switch PPSW1 into an ON state, and applies an appropriate control signal PC2 to the $2^{nd}$ positive pole connection switch PPSW2, thereby bringing the $2^{nd}$ positive pole connection switch PPSW2 into an OFF state, and applies an appropriate control signal PC3 to the $3^{rd}$ positive pole connection switch PPSW3, thereby bringing the $3^{rd}$ positive pole connection switch PPSW3 into an ON state, and applies an appropriate control signal PC4 to the $4^{th}$ positive pole connection switch PPSW4, thereby bringing the $4^{th}$ positive pole connection switch PPSW4 into an ON state.

Here, the ON state of a switch of the present disclosure means a state in which the first end of the switch is electrically connected to the second end thereof, and the OFF state of a switch means a state in which the first end of the switch is electrically disconnected from the second end thereof.

When the control unit 212 controls the operation of the respective switches NPSW1 to NPSW4, SPSW1, SPSW2, SPSW3, IPSW1, IPSW2, IPSW3, and PPSW1 to PPSW4 as described above, the electric connection of the fuel cell stacks shown in FIG. 5B is formed.

In other words, the control unit 212 electrically disconnects the $2^{nd}$ stack STK2 that is an failed stack from the $1^{st}$ stack STK1, the $3^{rd}$ stack STK3 and the $4^{th}$ stack STK4 which are the normal stacks by controlling the operation of the switches NPSW1 to NPSW4, SPSW1, SPSW2, SPSW3, IPSW1, IPSW2, IPSW3, and PPSW1 to PPSW4.

Accordingly, the present disclosure can prevent propagation of the performance reduction of the $2^{nd}$ stack STK2 that is an failed stack to normal stacks, thereby improving durability of the fuel cell system and minimizing the reduction in the life span of the fuel cell system.

Method of Controlling Fuel Cell System

Figure 6:
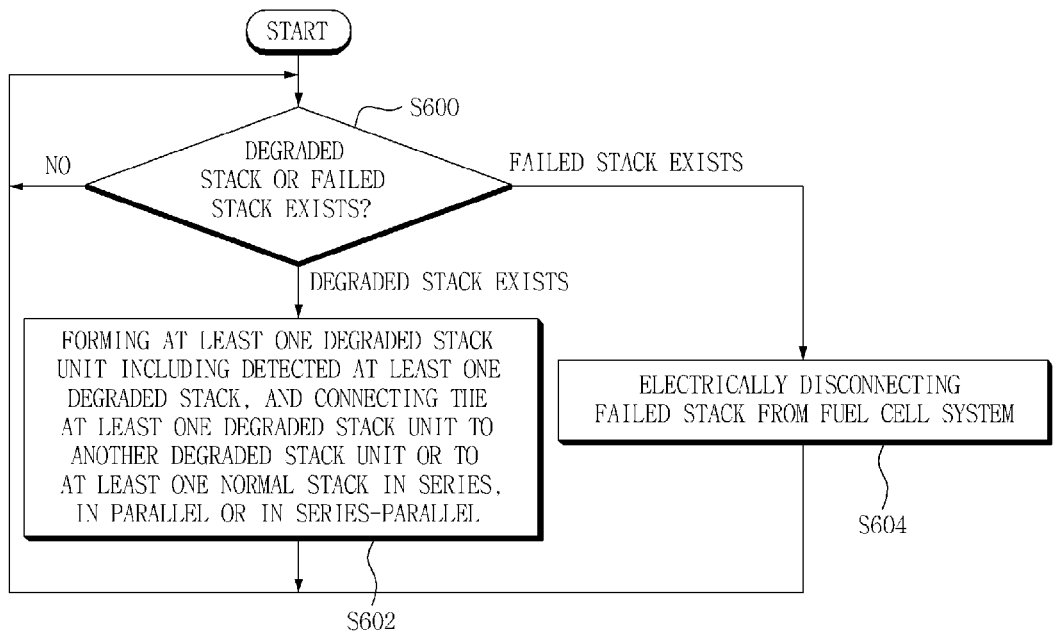
FIG. 6 is a flowchart of a method of controlling the fuel cell system according to an embodiment of the present disclosure.

FIG. 6 is a flowchart of a method of controlling the fuel cell system according to an embodiment of the present disclosure.

As shown in FIG. 6, at operation S600, the control unit 212 determines whether a degraded stack or an failed stack exists in the fuel cell system based on currents or voltages of the $1^{st}$ to $4^{th}$ stacks STK1 to STK4.

When the control unit 212 determines at operation S600 that at least one degraded stack exists in the fuel cell system, the control unit 212 forms at least one degraded stack unit including the detected at least one degraded stack, and connects the formed at least one degraded stack unit to another degraded stack unit or to at least one normal stack in series, in parallel or in series-parallel by controlling the operation of the switching units 200, 202, 204 and 206 at operation S602.

When the control unit 212 determines at operation S600 that an failed stack exists in the fuel cell system, the control unit 212 electrically disconnects and isolates the failed stack from the fuel cell system by controlling the operation of the switching units 200, 202, 204 and 206 at operation S604.

Accordingly, the present disclosure can minimize or prevent a degraded stack or an failed stack from ill-affecting normal stacks, so the present disclosure can improve durability of the fuel cell system and can minimize the reduction in the life span of the fuel cell system. Further, the present disclosure can reuse a degraded stack by rearranging the degraded stack, thereby efficiently using the fuel cell system.

The technology disclosed in the description of this invention may be variously embodied according to applications thereof. For example, the technology of this invention may be embodied in the form of hardware, firmware, software or the optional combination thereof. In an embodiment embodied in the form of hardware, the control circuit or the control unit may be embodied in the form of one or more application specific integrated circuits (ASICs), digital signal processors (DSPs), field programmable gate arrays (FPGAs), processors, controllers, microcontrollers, microprocessors, electronic devices, other electronic units designed to perform the functions disclosed in the description of this invention, and a combination thereof.

Although the preferred embodiments of the present disclosure have been disclosed for illustrative purposes, those skilled in the art will appreciate that various modifications, additions and substitutions are possible, without departing from the scope and spirit of the invention as disclosed in the accompanying claims.

Further, simple changes and modifications of the present disclosure are appreciated as included in the scope and spirit of the invention, and the protection scope of the present disclosure will be defined by the accompanying claims.

What is claimed is:

1. An apparatus for controlling a fuel cell system, comprising:
    a plurality of stack state detecting units for detecting respective states of a plurality of fuel cell stacks;
    a switching unit for connecting at least parts of the plurality of fuel cell stacks to each other in series or in parallel; and
    a control unit configured to detect at least one degraded stack based on the states of the stacks detected by the plurality of stack state detecting units, and configured to connect the detected at least one degraded stack to at least one normal stack in series by controlling an operation of the switching unit in order to prevent propagation of degradation from the detected at least one degraded stack to the other normal stacks.

2. The apparatus for controlling the fuel cell system as set forth in claim 1, wherein the plurality of fuel cell stacks are arrayed in an $n1 \times 1$, $n1 \times n2$ or $n1 \times n2 \times n3$ array, wherein $n1$, $n2$ and $n3$ are integers not less than two (2).

3. The apparatus for controlling the fuel cell system as set forth in claim 2, wherein the control unit connects the arrayed stacks to each other in series, in parallel or in series-parallel by controlling the operation of the switching unit, and supplies output power of the stacks to a power conditioning system (PCS).

4. The apparatus for controlling the fuel cell system as set forth in claim 3, wherein, when the control unit detects at least one failed stack based on states of stacks detected by $1^{st}$ to $n^{th}$ stack state detecting units, the control unit electrically disconnects the at least one failed stack from the fuel cell system by controlling the operation of the switching unit.

5. The apparatus for controlling the fuel cell system as set forth in claim 4, wherein
    the stack state detecting units detect currents or voltages of the stacks and supply the detected currents or voltages of the stacks to the control unit, and
    the control unit detects the degraded stack based on the currents or voltages detected by the stack state detecting units.

6. The apparatus for controlling the fuel cell system as set forth in claim 5, wherein the switching unit comprises:
    a negative pole connection switching unit for selectively connecting negative poles of the stacks to a negative voltage input terminal of the power conditioning system in response to a control signal of the control unit;
    a series-parallel connection switching unit for connecting negative poles of neighboring stacks of the stacks to each other or connecting the neighboring stacks to each other in series in response to a control signal of the control unit;
    a parallel connection switching unit for connecting positive poles of the neighboring stacks of the stacks to each other in response to a control signal of the control unit; and
    a positive pole connection switching unit for selectively connecting positive poles of the stacks to a positive voltage input terminal of the power conditioning system in response to a control signal of the control unit.

7. The apparatus for controlling the fuel cell system as set forth in claim 6, wherein, when n is an integer not less than two (2),
    the plurality of stacks include $1^{st}$ to $n^{th}$ stacks, and the stack state detecting units include $1^{st}$ to $n^{th}$ stack state detecting units, wherein first ends of the $1^{st}$ to $n^{th}$ stack state detecting units are connected to positive poles of the $1^{st}$ to $n^{th}$ stacks, respectively; and
    the negative pole connection switching unit includes $1^{st}$ to $n^{th}$ negative pole connection switches, the series-parallel connection switching unit includes $1^{st}$ to $n-1^{th}$ series-parallel connection switches, the parallel connection switching unit includes $1^{st}$ to $n-1^{th}$ parallel connection switches, and the positive pole connection switching unit includes $1^{st}$ to $n^{th}$ positive pole connection switches, wherein
    each of the $1^{st}$ to $n-1^{th}$ series-parallel connection switches includes a common terminal and $1^{st}$ to $3^{rd}$ terminals,
    the $1^{st}$ to $n^{th}$ negative pole connection switches, the $1^{st}$ to $n-1^{th}$ parallel connection switches and the $1^{st}$ to $n^{th}$ positive pole connection switches include respective first and second ends, wherein the first ends are electrically connected to or disconnected from the second ends in response to a control signal of the control unit, and
    the common terminal of each of the $1^{st}$ to $n-1^{th}$ series-parallel connection switches is connected to one of the $1^{st}$ to $3^{rd}$ terminals in response to a control signal of the control unit.

8. The apparatus for controlling the fuel cell system as set forth in claim 7, wherein
    the first ends of the $1^{st}$ to $n^{th}$ negative pole connection switches are commonly connected to the negative voltage input terminal of the power conditioning system, and the second ends of the $1^{st}$ to $n^{th}$ negative pole connection switches are connected to negative poles of the $1^{st}$ to $n^{th}$ stacks, respectively,
    the common terminals of the $1^{st}$ to $n-1^{th}$ series-parallel connection switches are connected to the negative poles of the $1^{st}$ to $n-1^{th}$ stacks, respectively, and the $1^{st}$ terminals of the $1^{st}$ to $n-1^{th}$ series-parallel connection switches are connected to second ends of the $2^{nd}$ to $n^{th}$ stack state detecting units, respectively, the $2^{nd}$ terminals of the $1^{st}$ to $n-1^{th}$ series-parallel connection switches are connected to the negative poles of the $2^{nd}$ to $n^{th}$ stacks, respectively, and the $3^{rd}$ terminals of the $1^{st}$ to $n-1^{th}$ series-parallel connection switches are opened,
    the first ends of the $1^{st}$ to $n-1^{th}$ parallel connection switches are connected to the second ends of the $1^{st}$ to $n-1^{th}$ stack state detecting units, respectively, and the second ends of the $1^{st}$ to $n-1^{th}$ parallel connection switches are connected to the second ends of the $2^{nd}$ to $n^{th}$ stack state detecting units, and the first ends of the $1^{st}$ to $n^{th}$ positive pole connection switches are connected to the second ends of the $1^{st}$ to $n^{th}$ stack state detecting units, respectively, and the second ends of the $1^{st}$ to $n^{th}$ positive pole connection switches are commonly connected to the positive voltage input terminal of the power conditioning system.

9. A method of controlling a fuel cell system including a plurality of fuel cell stacks electrically connected to each other in series or in parallel, the method comprising:

determining whether at least one degraded stack exists in the system by detecting states of the fuel cell stacks by a control unit; and when the control unit determines that at least one degraded stack exists in the fuel cell system, connecting the detected at least one degraded stack to at least one normal stack in series by controlling an operation of the switching unit in order to prevent propagation of degradation from the detected at least one degraded stack to the other normal stacks.

10. The method of controlling the fuel cell system as set forth in claim 9, further comprising:

connecting the at least one degraded stack unit to another degraded stack unit or to at least one normal stack in series, in parallel or in series-parallel by controlling the operation of the switching unit by the control unit.

11. The method of controlling the fuel cell system as set forth in claim 9, wherein the control unit connects the at least one degraded stack unit to another degraded stack unit or to at least one normal stack in series by controlling the operation of the switching unit.

12. The method of controlling the fuel cell system as set forth in claim 9, wherein each of the at least one degraded stack unit includes at least one degraded stack and an m number of or more normal stacks, wherein m is an integer not less than zero (0).

13. The method of controlling the fuel cell system as set forth in claim 12, wherein the plurality of fuel cell stacks are arrayed in an $n1 \times 1$, $n1 \times n2$ or $n1 \times n2 \times n3$ array, wherein n1, n2 and n3 are integers not less than two (2).

14. The method of controlling the fuel cell system as set forth in claim 13, wherein the control unit connects the arrayed stacks to each other in series, in parallel or in series-parallel by controlling the operation of the switching unit, and supplies output power of the stacks to a power conditioning system (PCS).

15. The method of controlling the fuel cell system as set forth in claim 14, wherein the control unit determines whether at least one failed stack exists in the fuel cell system by detecting the states of the fuel cell stacks, and when the control unit determines that at least one failed stack exists in the fuel cell system, the control unit electrically disconnects the at least one failed stack from the fuel cell system by controlling the operation of the switching unit.

16. The method of controlling the fuel cell system as set forth in claim 15, wherein a stack state detecting units detect currents or voltages of the stacks and supply the detected currents or voltages of the stacks to the control unit, and the control unit detects the degraded stack based on the currents or voltages detected by the stack state detecting units.

* * * * *